(12) United States Patent
Inoue et al.

(10) Patent No.: US 8,134,355 B2
(45) Date of Patent: Mar. 13, 2012

(54) SEMICONDUCTOR DEVICE AND RFID TAG USING THE SEMICONDUCTOR DEVICE

(75) Inventors: Hiroki Inoue, Kanagawa (JP); Kei Takahashi, Kanagawa (JP)

(73) Assignee: Semiconductor Energy Laboratory Co., Ltd. (JP)

( * ) Notice: Subject to any disclaimer, the term of this patent is extended or adjusted under 35 U.S.C. 154(b) by 110 days.

(21) Appl. No.: 12/571,938

(22) Filed: Oct. 1, 2009

(65) Prior Publication Data

US 2010/0085030 A1   Apr. 8, 2010

(30) Foreign Application Priority Data

Oct. 2, 2008 (JP) ................................. 2008-257008

(51) Int. Cl.
*G05F 3/26* (2006.01)
*G05F 3/28* (2006.01)
(52) U.S. Cl. .................. 323/315; 323/270; 323/281
(58) Field of Classification Search .................. 323/270, 323/273, 280, 281, 315, 316
See application file for complete search history.

(56) References Cited

U.S. PATENT DOCUMENTS

| | | | |
|---|---|---|---|
| 7,255,283 B2 | 8/2007 | Akaida et al. | |
| 7,309,978 B2 * | 12/2007 | Ku et al. | 323/316 |
| 7,492,137 B2 * | 2/2009 | Yamada | 323/280 |
| 7,821,242 B2 * | 10/2010 | Takagi | 323/275 |
| 7,902,801 B2 * | 3/2011 | Mandal | 323/273 |
| 2003/0086278 A1 | 5/2003 | Asami | |
| 2005/0161508 A1 | 7/2005 | Akaida et al. | |
| 2006/0261796 A1 * | 11/2006 | Park et al. | 323/312 |
| 2008/0150475 A1 | 6/2008 | Kato et al. | |
| 2008/0238385 A1 * | 10/2008 | Nagata et al. | 323/280 |
| 2009/0085534 A1 * | 4/2009 | Ko et al. | 323/270 |
| 2009/0267585 A1 * | 10/2009 | Liu et al. | 323/313 |

FOREIGN PATENT DOCUMENTS

| | | |
|---|---|---|
| JP | 2003-44802 | 2/2003 |
| JP | 2005-242989 | 9/2005 |
| WO | WO 2006/080052 A1 | 8/2006 |

OTHER PUBLICATIONS

Machine translation of JP 2003-044802A. Retrieved from http://dossier1.ipdl.inpit.go.jp/AIPN/odse_top_dn.ipdl?N0000=7400 on May 31, 2011.*

International Search Report re application No. PCT/JP2009/065980, dated Dec. 1, 2009.

(Continued)

*Primary Examiner* — Adolf Berhane
*Assistant Examiner* — Fred E Finch, III
(74) *Attorney, Agent, or Firm* — Husch Blackwell LLP

(57) ABSTRACT

A semiconductor device monitors a voltage between a reference potential and an input potential and obtains a constant output potential regardless of a value of the voltage, after the voltage exceeds a predetermined threshold voltage in such a manner that the semiconductor device divides a voltage between the reference potential and the input potential using a plurality of first non-linear elements and at least one linear element to constantly generate a first bias voltage regardless of a value of the voltage, divides a voltage between the reference potential and the input potential using a plurality of second non-linear elements with reference to the first bias voltage to constantly generate a second bias voltage regardless of a value of the voltage, and determines the output potential with reference to the second bias voltage.

18 Claims, 11 Drawing Sheets

OTHER PUBLICATIONS

Written Opinion re application No. PCT/JP2009/065980, dated Dec. 1, 2009.
Finkenzeller, K., "Principles and Applications of Non-Contact IC Cards," *RFID Handbook*, 2$^{nd}$ edition, Nikkan Kogyo Shimbun, Ltd., 2004, pp. 69-71 (with English translation, pp. 1-4).

* cited by examiner

FIG. 2
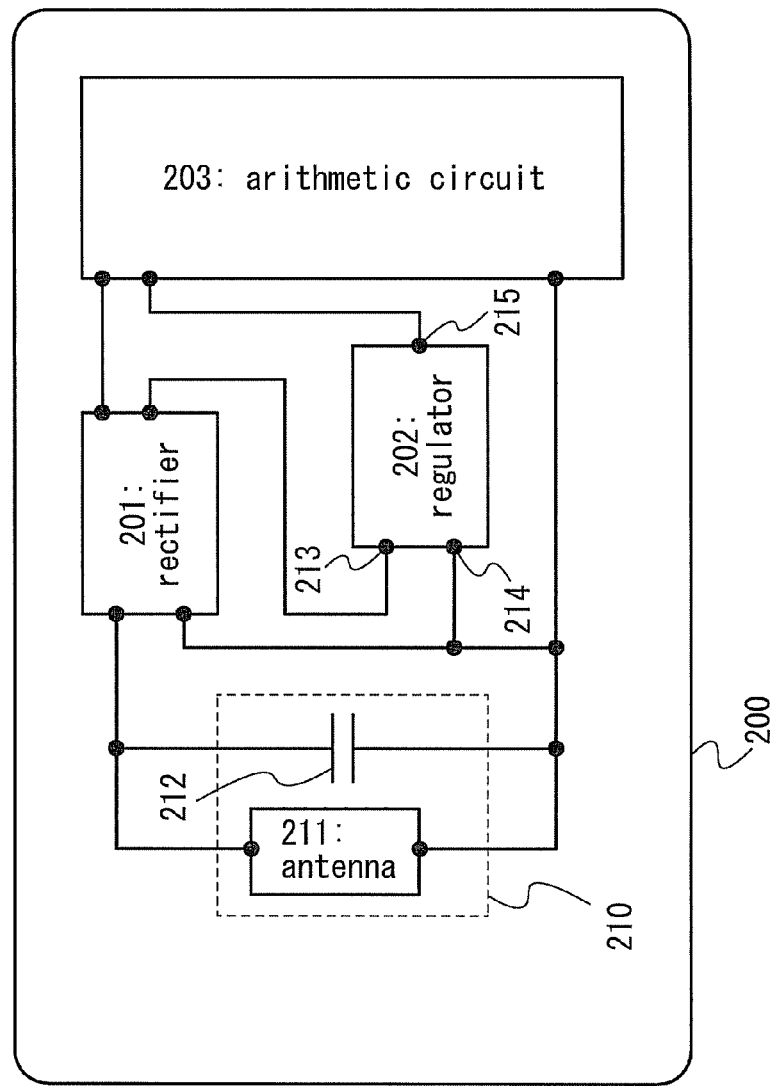
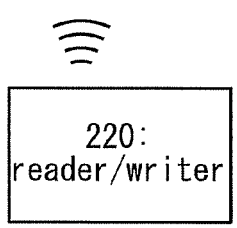

□ 113   ▨ 114   ▨ 115

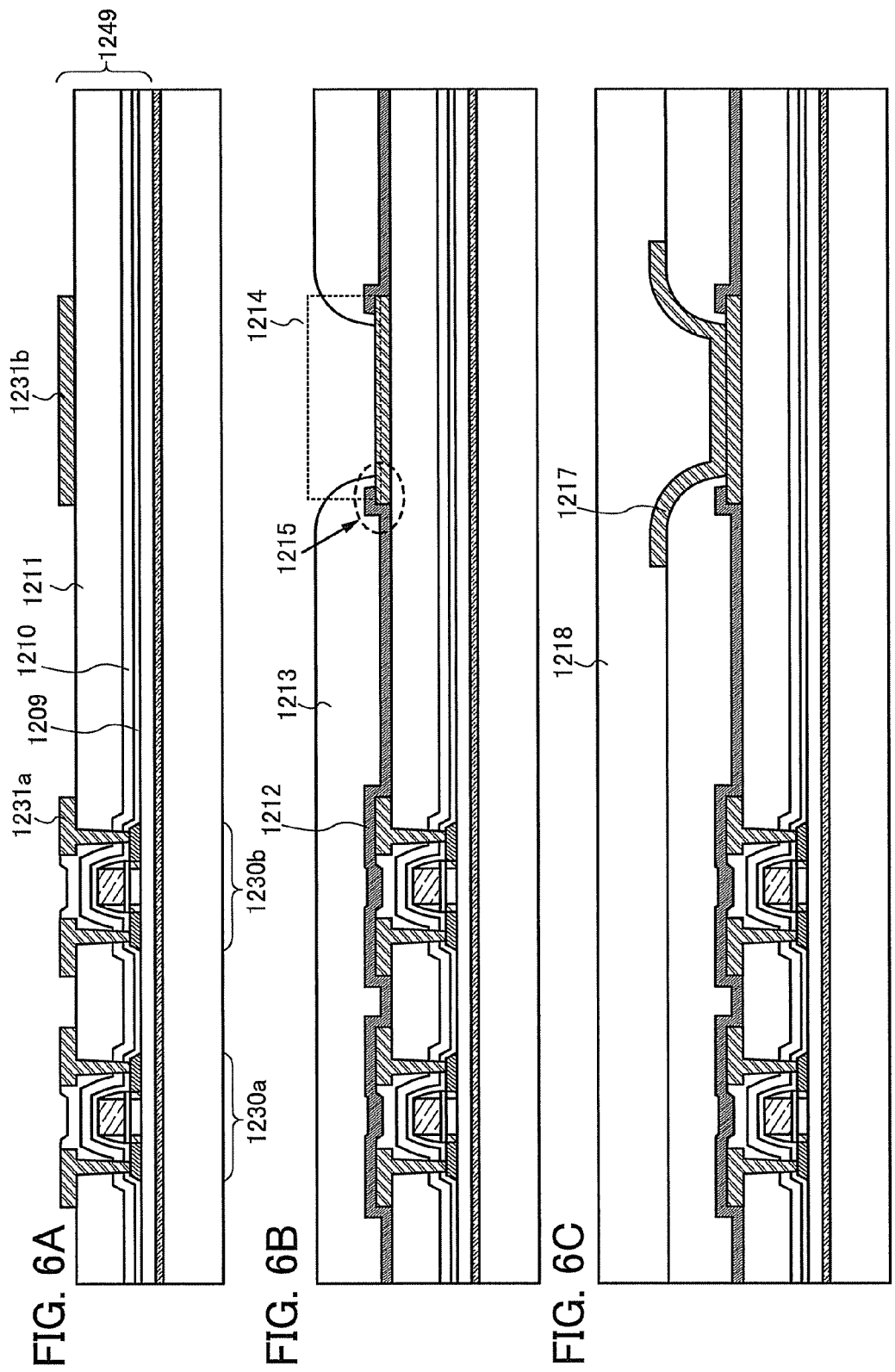

1101

1102

1103

SEMICONDUCTOR DEVICE AND RFID TAG USING THE SEMICONDUCTOR DEVICE

TECHNICAL FIELD

The present invention relates to an RFID tag that transmits and receives data by wireless communication. In particular, the present invention relates to a regulator circuit that stabilizes a DC voltage generated in the RFID tag or controls the DC voltage to be constant.

BACKGROUND ART

In recent years, an environment where information network can be accessed at any time in any situations, which is referred to as a ubiquitous information society, has been facilitated. In such an environment, an individual identification technique has attracted attentions, such that an identification number (ID) is assigned to each object, whereby the history of the object is clarified and the production, management, or the like is facilitated. Above all, a semiconductor device capable of transmitting and receiving data by wireless communication has begun to be utilized.

As a semiconductor device capable of transmitting, receiving, storing, and deleting data by wireless communication, an individual identification technique utilizing a radio-frequency identification (RFID) tag has attracted attention. The RFID tag is also referred to as an integrated circuit (IC) tag, an RF tag, a wireless tag, an electronic tag, an IC chip, or a wireless chip. A device for reading and writing data (hereinafter referred to as a reader/writer) is used for transmitting and receiving data to and from the RFID tag. The individual identification technique with the use of the RFID tag has been useful for production, management, or the like of an individual object, and application thereof to personal authentication has been expected.

The RFID tag includes an antenna for transmitting and receiving an electromagnetic wave, electric wave, or the like of data by wireless communication, and has a structure in which the antenna and an integrated circuit are formed integrally. Some of the RFID tags generate a DC voltage from an electromagnetic wave, electric wave, or the like transmitted from an external device such as a reader/writer with the use of a rectifier or a rectifier circuit included in the RFID tags. Further, some of the RFID tags are operated with a stable, constant voltage with the use of a controller such as a regulator circuit.

REFERENCE

[Patent Document]
[Patent Document 1] Japanese Published Patent Application No. 2005-242989
[Patent Document 2] International Publication WO 2006/80052 Pamphlet
[Non-Patent Document]
[Non-Patent Document 1] Klaus Finkenzeller, "Principles and Applications of Non-contact IC Cards", RFID Handbook Second Edition, Translation by SOFEL Research and Development, The Nikkan Kogyo Shimbun, Ltd., 2004, pp. 69-71.

DISCLOSURE OF INVENTION

In transmitting and receiving data between an RFID tag and a reader/writer, as the distance between the RFID tag and the reader/writer becomes longer, electric power that the RFID tag obtains from an electromagnetic wave, electric wave, or the like from the reader/writer becomes lower. An RFID tag is operated using the electric power obtained from an electromagnetic wave, electric wave, or the like from the reader/writer. The electric power that is necessary for the operation depends on an operation voltage of an integrated circuit included in the RFID tag. Note that a circuit group included in the integrated circuit may be provided with a rectifier circuit, a regulator circuit, a modulation circuit, a demodulation circuit, a clock generation circuit, an arithmetic circuit, or the like.

In a structure where an RFID tag includes a regulator circuit, the minimum operation power of the RFID tag depends on an input voltage of the regulator circuit, which is necessary for the regulator circuit to output a voltage that is higher than or equal to a given voltage value or a constant voltage that is given. This input voltage is referred to as the minimum operation voltage of the regulator circuit. Thus, the higher the minimum operation voltage of the regulator circuit is, the higher the minimum operation power of the RFID tag becomes. That is, electric power that the RFID tag needs to obtain from an electromagnetic wave, an electric wave, or the like from the reader/writer also becomes higher. Since the electric power that can be obtained depends on the distance between the RFID tag and the reader/writer, the communication distance between the RFID tag and the reader/writer has been short.

It is preferable that an RFID tag reduce consumption power of circuits as much as possible so that the communication distance can be longer. In order to reduce the consumption power, the operation voltage inside the RFID tag is reduced to less than or equal to about 1 V to about 2 V, that is, the minimum operation voltage of a regulator is changed by only several tenth of a voltage, and the relative influence on the entire operation voltage of the RFID tag is significant.

In view of the above problems, it is an object of one embodiment of the present invention to obtain a regulator circuit that can be operated stably with a lower minimum operation voltage. It is another object of one embodiment of the present invention to achieve an RFID tag using the regulator circuit with the low minimum operation voltage, which has a long communication distance with a reader/writer.

The following measures have been taken in an embodiment of the present invention to achieve the above-described objects.

An embodiment of the present invention provides a semiconductor device that monitors a voltage between a reference potential and an input potential, and obtains a constant output potential regardless of a value of the voltage after the voltage exceeds a predetermined threshold voltage.

The semiconductor device includes the following: a first terminal to which the reference potential is applied; a second terminal to which the input potential is applied; a first voltage divider including a plurality of first nonlinear elements provided between the first terminal and the second terminal and at least one linear element, which outputs a first bias potential divided by the plurality of the first nonlinear elements and the at least one linear element; a second voltage divider including a plurality of second nonlinear elements provided between the first terminal and the second terminal, which outputs a second bias potential divided by the plurality of the second nonlinear elements based on the first bias potential; and a voltage regulator that determines and outputs the output potential based on the second bias potential.

The semiconductor device includes a first to sixth transistors and a resistor, in which a gate of the first transistor is electrically connected to a gate of the second transistor, either a source or a drain of the first transistor is electrically connected to a first wiring and the other of the source and the drain of the first transistor is electrically connected to either a source or a drain of the third transistor, either a source or a drain of the second transistor is electrically connected to the first wiring and the other of the source and the drain of the second transistor is electrically connected to either a source or a drain of the fourth transistor, a gate of the second transistor is electrically connected to the other of the source and the drain of the second transistor, a gate of the third transistor is electrically connected to the other of the source and the drain of the fourth transistor, the other of the source and the drain of the third transistor is electrically connected to a second wiring, a gate of the fourth transistor is electrically connected to either the source or the drain of the third transistor, one terminal of the resistor is electrically connected to the other of the source and the drain of the fourth transistor and the other terminal of the resistor is electrically connected to the second wiring, a gate of the fifth transistor is electrically connected to the other of the source and the drain of the second transistor, either a source or a drain of the fifth transistor is electrically connected to the first wiring and the other of the source and the drain of the fifth transistor is electrically connected to either a source or a drain of the sixth transistor, a gate of the sixth transistor is electrically connected to either the source or the drain of the sixth transistor and the other of the source and the drain of the sixth transistor is electrically connected to the second wiring.

At this time, the input potential is applied to the first wiring and the reference potential is applied to the second wiring; accordingly, a first bias voltage is generated in the other of the source and the drain of the second transistor and the output potential is extracted from the other of the source and the drain of the fifth transistor.

The above semiconductor device provides a regulator circuit including a voltage regulator for outputting a potential in accordance with the output potential.

An embodiment of the present invention provides an RFID tag including the regulator circuit described above.

An embodiment of the present invention provides a regulator circuit having a low minimum operation voltage. That is, the minimum operation power of an RFID tag including the regulator circuit can be reduced. From the above, in a passive RFID tag (an RFID tag that does not include a power source such as a battery inside the tag and generates the power source from electric power received from a reader/writer), the communication distance between the RFID tag and the reader/writer can be long.

In addition, in an active RFID tag (an RFID tag that includes a battery or the like inside the tag, for supplying a power source needed for the operation of circuits inside), normal operation can be performed even with a lower voltage by the regulator circuit according to an embodiment of the present invention, resulting in extension of the battery lifetime.

BRIEF DESCRIPTION OF DRAWINGS

FIG. 2 illustrates an example of a structure of an RFID tag using a regulator circuit according to an embodiment of the present invention.

FIGS. 6A to 6C illustrate an example of manufacturing steps of a semiconductor device.

BEST MODE FOR CARRYING OUT THE INVENTION

Figure 1:
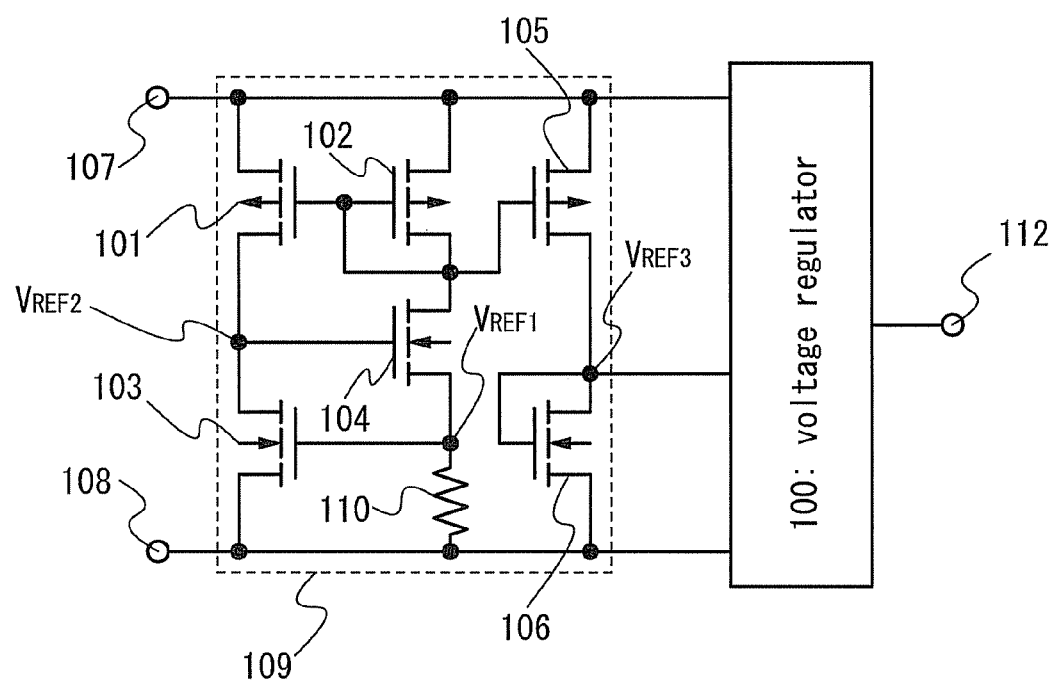
FIG. 1 illustrates an example of a regulator circuit according to an embodiment of the present invention.

Hereinafter, embodiments of the present invention will be described in detail with reference to the accompanying drawings. However, the present invention is not limited to the descriptions below, and it is easily understood by those skilled in the art that modes and details thereof can be modified in various ways without departing from the purpose and the scope of the present invention. Therefore, the present invention should not be interpreted as being limited to what is described in the embodiments described below. The same reference numerals are commonly given to the same components or components having the same function in the structure of the invention, and a repetitive explanation will be omitted.

Embodiment 1

A structure of a regulator circuit according to an embodiment of the present invention is described with reference to FIG. 1.

The regulator circuit according to an embodiment of the present invention includes, as illustrated in FIG. 1, a voltage regulator 100 and a bias circuit 109.

A potential to be a reference of the circuit illustrated in FIG. 1 is applied to a reference power source terminal 108. In general, 0 V is applied; however, a voltage other than 0 V can also be applied because it is only the potential to be a reference of the circuit.

An input power source terminal 107 is a terminal to which a potential is applied such that a voltage with respect to the reference power source terminal 108 is applied.

A bias circuit 109 generates $V_{REF3}$ to be a reference potential of the voltage regulator 100 in accordance with a voltage applied to the input power source terminal 107 and the reference power source terminal 108.

The voltage regulator 100 outputs a potential so as to apply a voltage higher than or equal to a given value, or a constant voltage that is given with respect to the reference power source terminal 108 from an output terminal 112, in accordance with the voltage applied to the input power source terminal 107 and the reference power source terminal 108 and the reference potential generated in the bias circuit 109.

The output terminal 112 is followed by load including an arithmetic circuit and the like. When the consumption power in the load is increased and a voltage in the output terminal 112 is decreased, the voltage regulator 100 is operated so as to increase a potential of the output terminal 112 so that the original constant potential can be kept. On the other hand, when the consumption power in the load is decreased and a voltage in the output terminal 112 is increased, the voltage regulator 100 is operated so as to decrease a potential of the output terminal 112 so that the original constant potential can be kept.

Note that a structure of the voltage regulator 100 is not particularly limited in this embodiment of the present invention. Any structure may be employed as long as it is a structure where fluctuations of potentials of the output terminal 112 can be adjusted and a potential can be output to the output terminal 112 in accordance with the reference potential $V_{REF3}$.

The bias circuit 109 includes transistors 101 to 106 and a resistor 110. The transistors 101, 102, and 105 are p-channel transistors. The transistors 103, 104, and 106 are n-channel transistors.

The operation of the regulator circuit according to an embodiment of the present invention illustrated in FIG. 1 is described in detail hereinafter.

The bias circuit 109 outputs a constant potential to $V_{REF3}$ with respect to the reference power source terminal 108 regardless of fluctuations of potentials input to the input power source terminal 107. By taking advantage of a feature that $V_{REF3}$ does not depend on a power potential to be input, the voltage regulator 100 outputs a constant potential to the output terminal 112.

The operation of the bias circuit 109 is described. Either sources or drains of the transistors 101 and 102 are each electrically connected to the input power source terminal 107, and gates of the transistors 101 and 102 are electrically connected to each other to form a current mirror. Accordingly, current values flowing in the transistors 101 and 102 are equal.

All of the current flowing in the transistor 101 flows in the transistor 103, and a current flowing in the transistor 102 flows in the resistor 110. At this time, a voltage generated between both of the terminals of the resistor 110 becomes equal to a gate-source voltage (hereinafter expressed as $V_{gs}$) of the transistor 103; thus, a current value flowing in the current mirror is determined by balance of the transistor 103 and the resistor 110.

The transistor 104 is provided to secure the operation of the transistor 103 in a saturation region. A current flowing in the transistor 102 flows via the transistor 104 into the resistor 110. At this time, a voltage in accordance with the current is generated between the gate and the source of the transistor 104 and a potential of the gate of the transistor 103 becomes $V_{REF1}$.

At this time, a voltage in accordance with a current flowing in the resistor 110 is generated between the gate and the source of the transistor 103. At the same time, voltage is also generated between the gate and the drain of the transistor 103, which is generated between the gate and the source of the transistor 104. In the transistor 103, the following formula is always satisfied: $|V_{gs}-V_{th}| \leq |V_{ds}|$, and the operation in a saturation region is secured. Here, $V_{th}$ expresses a threshold voltage of a transistor and $V_{ds}$ expresses a voltage between a source and a drain of a transistor.

In addition, in the case where a potential of the input power source terminal 107 with respect to the reference power source terminal 108 is increased by the transistor 104, the transistor 104 is operated in a saturation region. By changing $V_{ds}$, the above-described voltage change in accordance with the increase of a potential is not transmitted to $V_{REF1}$.

By the above operation, a constant potential is output to each $V_{REF1}$ and $V_{REF2}$, regardless of fluctuations of potentials input to the input power source terminal 107 with respect to the reference power source terminal 108.

Here, a potential generated in $V_{REF1}$ and $V_{REF2}$ is focused. $V_{REF1}$ is a potential in accordance with $V_{gs}$ that is generated in accordance with a current flowing in the transistor 103. $V_{REF2}$ is a potential obtained by adding $V_{gs}$ generated in accordance with a current flowing in the transistor 104 to $V_{REF1}$. The potential of $V_{REF1}$ is affected by characteristic variations of the transistor 103. The potential of $V_{REF2}$ is affected by characteristic variations of the transistor 103 and of the transistor 104. That is, $V_{REF2}$ is affected by variations of more transistors than $V_{REF1}$; thus, $V_{REF2}$ can cause variations more easily.

On the other hand, $V_{REF1}$ is a potential in accordance with $V_{gs}$ of the transistor 103 and the amount of increase is the same as that of $V_{gs}$ of the transistor 103. $V_{REF2}$ is a potential in accordance with $V_{gs}$ of the transistor 103 and $V_{gs}$ of the transistor 104, and the amount of increase is the sum of that of $V_{gs}$ of the transistor 103 and of $V_{gs}$ of the transistor 104. Accordingly, in a region where a potential of the input power source terminal 107 is low, timing of rising of the potential of $V_{REF2}$ is quick, and the rising is sharp. In addition, since resistance between a source and a drain of a transistor that is operated in a saturation region can be easily made high, enough voltage can be generated with a small current.

That is, $V_{REF1}$ is not relatively affected by variations of the transistor; however, the timing of rising of a potential is slow and the rising is gradual. $V_{REF2}$ has, on the other hand, a feature that the timing of rising of a potential is quick and the rising is sharp; however, it is relatively affected by variations of the transistor.

In an embodiment of the present invention, a structure including the transistors 105 and 106 is added. The transistor 105 copies a current flowing in the transistor 102 and the current flows into the transistor 106 that is diode-connected. Consequently, voltage is generated between a source and a drain of the transistor 106. Since $V_{gs}$ of the transistor 105 is constant, a current flowing in the transistor 105 is also constant regardless of variations in a voltage between the reference power source terminal 108 and the input power source terminal 107. By the above operation, $V_{REF3}$ is further obtained that is a constant voltage regardless of variations in a voltage between the reference power source terminal 108 and the input power source terminal 107.

$V_{REF3}$ is a potential in accordance with $V_{ds}$ of the transistor 106 that is diode-connected and determined with a potential based on $V_{REF1}$ that is not easily affected by variations, and the transistor 106 is operated in a saturation region; accordingly, the timing of rising of a potential can be quick and the rising can be sharp.

From the above, by including the bias circuit 109 with a novel structure, a regulator circuit according to an embodiment of the present invention can generate $V_{REF3}$ even when a potential to be input to the input power source terminal 107 is not high enough, and can output a potential having a given voltage or a given constant voltage with respect to the reference power source terminal 108.

In addition, because the regulator circuit has a lower minimum operation voltage, an RFID tag including the regulator circuit according to an embodiment of the present invention has a lower minimum operation power, resulting in a longer communication distance between the RFID tag and the reader/writer.

Embodiment 2

An example of a structure of an RFID tag using a regulator circuit according to an embodiment of the present invention described in Embodiment 1 is illustrated in FIG. 2. An RFID tag 200 includes an antenna circuit 210, a rectifier circuit 201, a regulator circuit 202, and an arithmetic circuit 203. Note that a structure of the RFID tag 200 is not limited to this structure and other structures may also be employed.

As one of specific operations, an electromagnetic wave, an electric wave, or the like is transmitted from a reader/writer 220 to the RFID tag 200 by wireless communication. A command signal transmitted from the reader/writer 220 to the RFID tag 200 is included in the electromagnetic wave, the electric wave, or the like. The command signal is extracted from the electromagnetic wave, the electric wave, or the like received by the RFID tag 200, and an arithmetic process and the like are performed inside the RFID tag 200 according to the command signal. As a result, a response signal is transmitted from the RFID tag 200 to the reader/writer 220. Communication between the reader/writer 220 and the RFID tag 200 is conducted in this manner and the reader/writer 220 can read out data recorded in the RFID tag 200 and write data into the RFID tag 200.

Note that a frequency band of an electromagnetic wave, an electric wave, or the like to be used in the communication may be, but not particularly limited to, the one under the Radio Law or International Organization for Standardization. In an embodiment of the present invention, the frequency band is not necessarily particularly limited.

The antenna circuit 210 includes an antenna 211 and a capacitor 212, receives an electromagnetic wave, an electric wave, or the like transmitted from the reader/writer 220 or transmits a response signal to the reader/writer 220 from the antenna circuit 210. The antenna circuit 210 formed using the antenna 211 and the capacitor 212 is designed to have a particular resonance point to be able to receive an electromagnetic wave, an electric wave, or the like of a particular frequency band most effectively.

The rectifier circuit 201 rectifies an electromagnetic wave or an electric wave that is received by the antenna circuit 210 and generates a DC voltage. A format of the rectifier circuit 201 is not particularly limited and any format that is considered to be suitable for the implementation may be used as appropriate.

The regulator circuit 202 inputs the DC voltage generated by the rectifier circuit 201 to an input power source terminal 213 and a reference power source terminal 214, extracts a constant potential from the output terminal 215 regardless of variations in an output voltage of the rectifier circuit 201, and supplies it to the arithmetic circuit 203.

The arithmetic circuit 203 outputs a response signal for responding as an RFID tag in accordance with a command signal transmitted by being superposed in an electromagnetic wave or an electric wave from the reader/writer 220. A structure inside the arithmetic circuit 203 may include, but not particularly limited to, a modulation circuit, a demodulation circuit, a memory, a memory controller, a signal processing circuit, an encoding circuit, a resistor, a capacitor, a filter, an analyzing circuit, a clock generation circuit, a clock correction circuit, a code extraction circuit, a code recognition circuit, a code determination circuit, or the like.

In addition, it is not necessary for all of the circuit groups included in the arithmetic circuit 203 to use an output voltage of the regulator circuit 202 as a power source. A DC voltage output from the rectifier circuit 201, for example, may be used directly.

In the case of using the regulator circuit according to an embodiment of the present invention in the RFID tag 200, the minimum operation voltage of the regulator circuit can be lower than ever before. That is, in a case where a voltage generated in the rectifier circuit 201 is low, and specifically, the distance between the reader/writer 220 and the RFID tag 200 is long, or in a case where electric power received in the antenna circuit 210 is low because of a disturbance, a voltage necessary for the RFID tag 200 to be operated can be low with the use of an embodiment of the present invention; accordingly, the communication distance between the reader/writer 220 and the RFID tag 200 can be longer.

Embodiment 3

Figure 3:
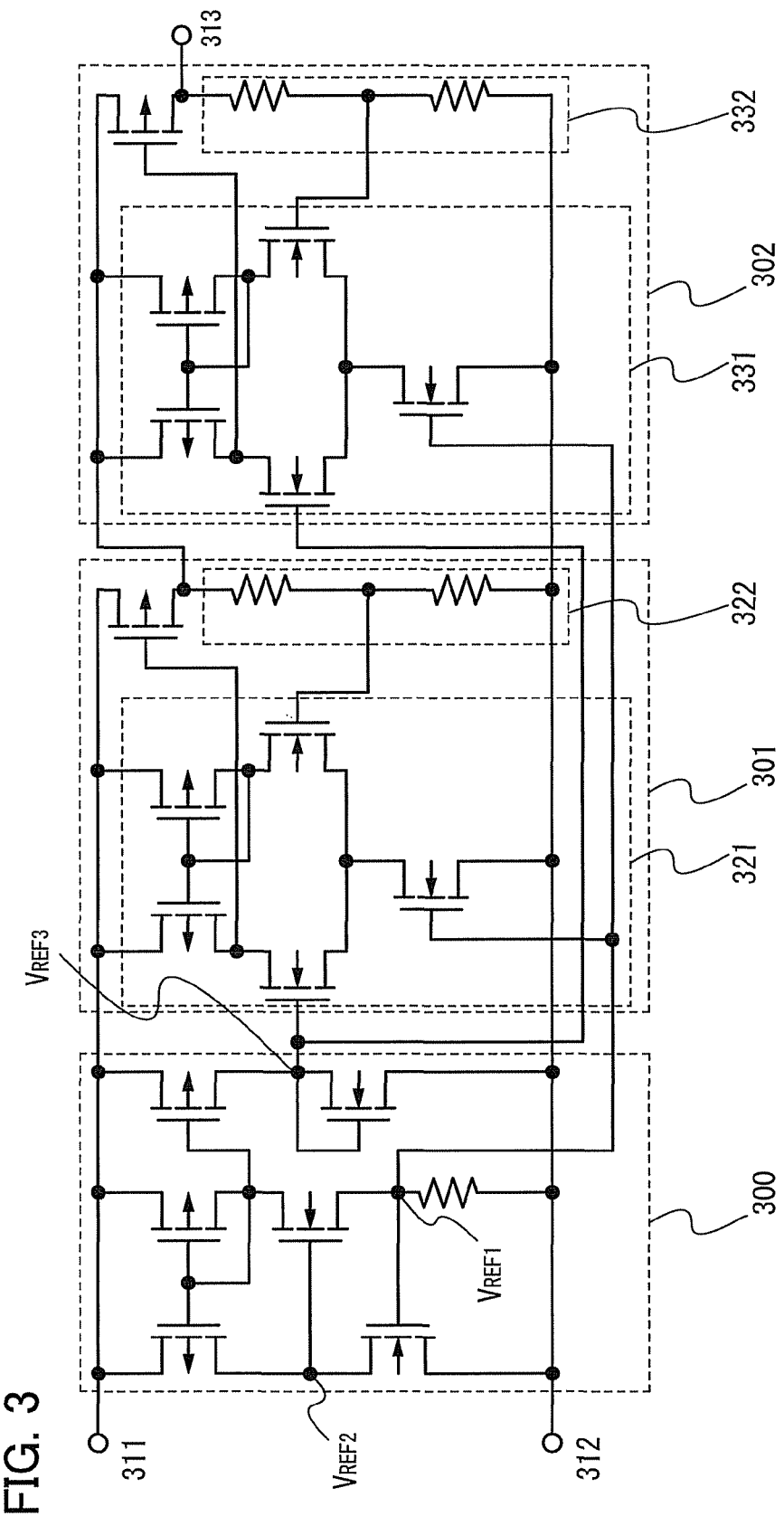
FIG. 3 illustrates an example of a structure of a regulator circuit according to an embodiment of the present invention.

An example of a practical structure of a regulator circuit according to an embodiment of the present invention described in Embodiment 1 with reference to FIG. 1 is illustrated in FIG. 3.

In this embodiment, a regulator circuit includes a bias circuit 300, a voltage regulator 301, and a voltage regulator 302. The two-stage structure of the voltage regulators is employed because a first stabilization is performed in the voltage regulator 301 of a first stage and a second stabilization is performed in the voltage regulator 302 of a second stage so that fluctuations of a potential of an input power source terminal 311 affect on an output power source terminal 313 for supplying a potential to an arithmetic circuit as little as possible.

The voltage regulator 301 includes a differential amplifier circuit 321 and a voltage divider 322. Similarly, the voltage regulator 302 includes a differential amplifier circuit 331 and a voltage divider 332.

A bias potential $V_{REF3}$ output from the bias circuit 300 is input to one input terminal of the differential amplifier circuit 321. The voltage regulator 301, in accordance with $V_{REF3}$, outputs a constant potential regardless of fluctuations of the input power source terminal 311. The voltage divider 322 inputs the power source potential that is fluctuated in accordance with the fluctuations of the amount of a current that is consumed in the arithmetic circuit and the like, to the other input terminal of the differential amplifier circuit 321 in a negative feedback arrangement in order to be stabilized. The voltage regulator 302 is operated in a similar manner so that a potential to be finally output to an output power source terminal 313 can be highly stable with respect to fluctuations of the received electric power and the like, and also highly stable with respect to fluctuations of a current that is consumed by the operation of internal circuits and the like.

Embodiment 4

Figure 4:
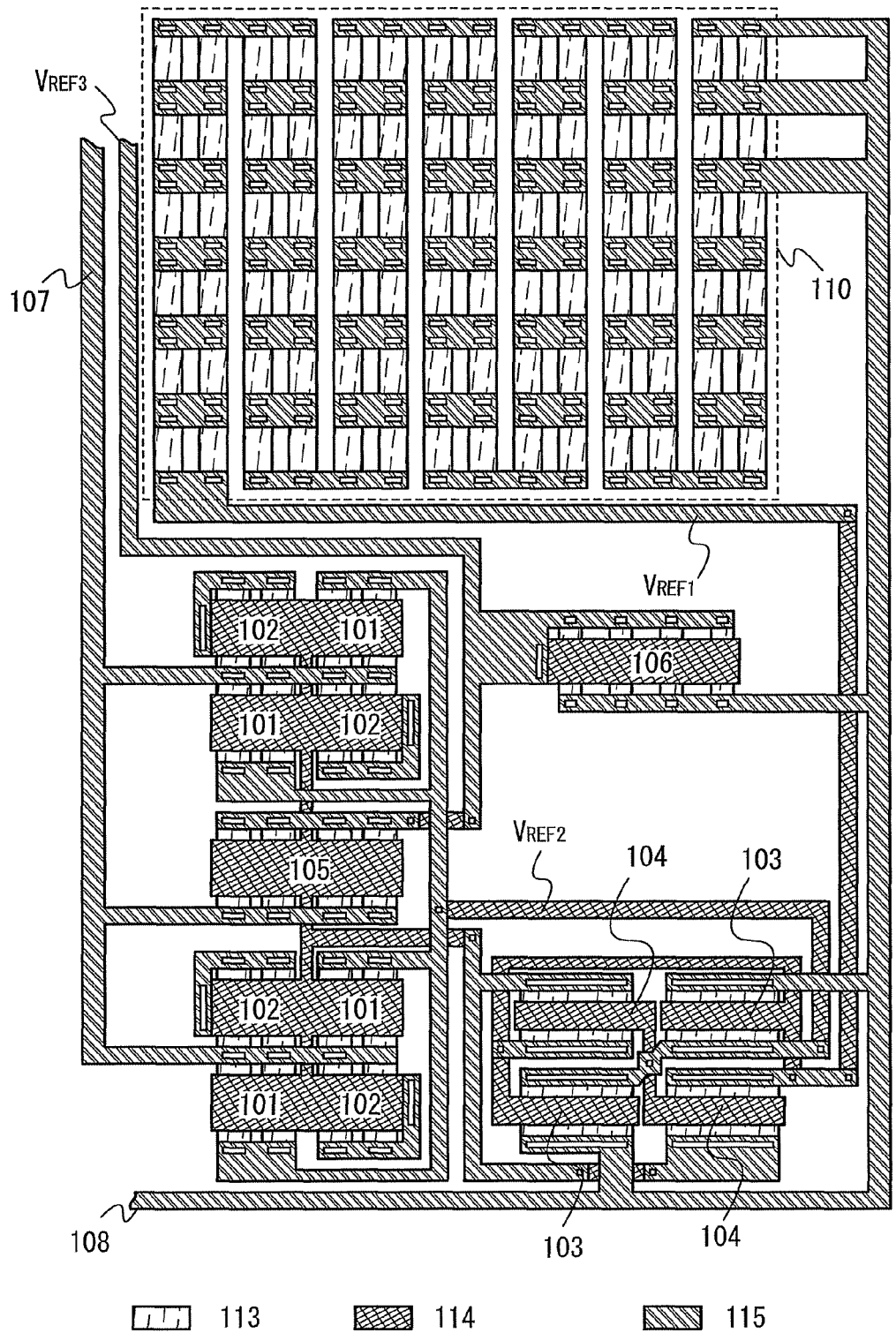
FIG. 4 illustrates an example of a layout of circuits in a regulator circuit according to an embodiment of the present invention.

An example of a practical layout including a transistor forming the bias circuit 109, a resistor, a wiring and the like on a substrate in a regulator circuit according to an embodiment of the present invention described in Embodiment 1 is illustrated in FIG. 4. In FIG. 4, a semiconductor layer is shown with a hatch 113, and a conductive layer (gate) is shown with a hatch 114, and a conductive layer (wiring) is shown with a hatch 115.

Each of the reference numerals in FIG. 4 corresponds to those in FIG. 1.

In the resistor 110, a plurality of unit resistor elements of a small size are arranged at a stage of element layout. The unit resistor elements are arranged using a wiring layer of an upper layer in a manner that the connection can be changed in series or in parallel so that a resistor value can be in accordance with a designed value.

In the transistors denoted by reference numerals 101, 102, 103, 104, 105, 106 and the like, a plurality of transistors of a small size may be connected in parallel to form a transistor of a large size so that the influence of variations can be suppressed.

Embodiment 5

In this embodiment, an example of a method for manufacturing the semiconductor device described in any of the above embodiments is described.

Figure 5A:
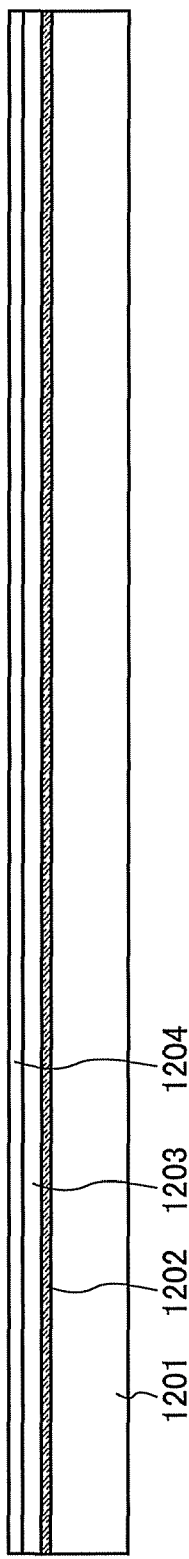
FIGS. 5A to 5C illustrate an example of manufacturing steps of a semiconductor device.

First, a separation layer 1202 is formed on a surface of a substrate 1201, and then an insulating film 1203 serving as a base and a semiconductor film 1204 (for example, a film containing amorphous silicon) are formed (see FIG. 5A). The separation layer 1202, the insulating film 1203, and the semiconductor film 1204 can be formed successively. The successive formation can prevent entry of impurities so as not to be exposed to the air.

A glass substrate, a quartz substrate, a metal substrate, a stainless steel substrate, a plastic substrate having heat resistance enough to withstand processing temperatures of a process in this embodiment, or the like may be used as the substrate 1201. Since the area and shape are not particularly limited, for example, a rectangular substrate having one side of 1 meter or more can be used. It has a great advantage because the productivity can be remarkably increased as compared to the case of using a circular silicon substrate. Accordingly, the cost can be reduced as compared to the case of using the silicon substrate, even when a circuit portion occupies a large area.

Note that, although the separation layer 1202 is provided on an entire surface of the substrate 1201 in this process, the separation layer 1202 may also be selectively provided as needed by a photolithography method. In addition, the separation layer 1202 is formed so as to be in contact with the substrate 1201; however, an insulating film such as a silicon oxide film, a silicon oxynitride film, a silicon nitride film, or a silicon nitride oxide film, may be formed so as to be in contact with the substrate 1201 as needed, and the separation layer 1202 may be formed so as to be in contact with the insulating film.

Here, the term "an oxynitride" refers to a substance that contains more oxygen than nitrogen, and "nitride oxide" refers to a substance that contains more nitrogen than oxygen. For example, silicon oxynitride can be a substance that contains oxygen, nitrogen, silicon, and hydrogen at concentrations ranging from 50 at. % to 70 at. %, inclusive, 0.5 at. % to 15 at. %, inclusive, 25 at. % to 35 at. %, inclusive, and 0.1 at. % to 10 at. %, inclusive, respectively. Silicon nitride oxide can be a substance that contains oxygen, nitrogen, silicon, and hydrogen at concentrations ranging from 5 at. % to 30 at. %, inclusive, 20 at. % to 55 at. %, inclusive, 25 at. % to 35 at. %, inclusive, and 10 at. % to 30 at. %, inclusive, respectively. The composition ratios were measured using Rutherford backscattering spectrometry (RBS) and hydrogen forward scattering (HFS). Moreover, the total for the content ratio of the constituent elements does not exceed 100 at. %.

As the separation layer 1202, a metal film, a stacked-layer structure of a metal film and a metal oxide film, or the like can be used. The metal film is formed of an element selected from tungsten (W), molybdenum (Mo), titanium (Ti), tantalum (Ta), niobium (Nb), nickel (Ni), cobalt (Co), zirconium (Zr), zinc (Zn), ruthenium (Ru), rhodium (Rh), palladium (Pd), osmium (Os), and iridium (Ir), or an alloy material or a compound material which includes any of these elements as a main component, and has a single-layer structure or a stacked-layer structure. The film can be formed by a sputtering method, various CVD methods such as a plasma CVD method or the like, using these materials. As the stacked layer structure of a metal film and a metal oxide film, after the above-described metal film is formed, an oxide or oxynitride of the metal film can be formed on the metal film surface by performing plasma treatment in an oxygen atmosphere or an $N_2O$ atmosphere, or heat treatment in an oxygen atmosphere or an $N_2O$ atmosphere. Alternatively, the surface of the metal film may be processed with a strong oxidative solution such as ozone water after the above-described metal film is formed, whereby an oxide or an oxynitride of the metal film can be provided on a surface of the metal film.

As the insulating film 1203, a single layer or a stacked layer of a film containing oxide of silicon or nitride of silicon is formed by a sputtering method, a plasma CVD method, or the like. In a case where the insulating film serving as a base has a two-layer structure, for example, a silicon nitride oxide film can be formed as a first layer, and a silicon oxynitride film can be formed as a second layer. In a case where the insulating film serving as a base has a three-layer structure, for example, a silicon oxide film can be formed as a first insulating film, a silicon nitride oxide film can be formed as a second insulating film, and a silicon oxynitride film can be formed as a third insulating film. Alternatively, a silicon oxynitride film can be formed as the first insulating film, a silicon nitride oxide film can be formed as the second insulating film, and a silicon oxynitride film can be formed as the third insulating film. The insulating film 1203 serving as a base serves as a blocking film for preventing the entry of impurities from the substrate 1201.

The semiconductor film 1204 can be formed by a sputtering method, an LPCVD method, a plasma CVD method, or the like, to have a thickness about from 25 nm to 200 nm, inclusive. The thickness is preferably about from 50 nm to 70 nm, inclusive, specifically, 66 nm. An amorphous silicon film may be formed as the semiconductor film 1204.

Figure 5B:
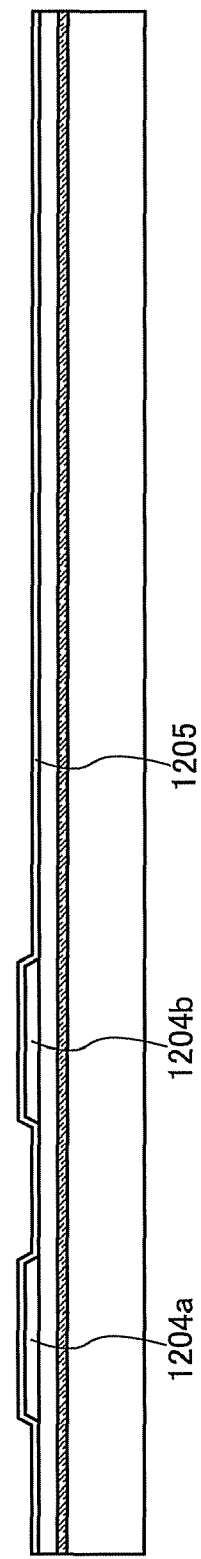

Next, the semiconductor film 1204 is irradiated with laser light to be crystallized. Note that the semiconductor film 1204 may be crystallized by a method in which laser light irradiation is combined with a thermal crystallization method using RTA or an annealing furnace, or a thermal crystallization method using a metal element that promotes crystallization. Then, the obtained crystalline semiconductor film is etched into a desired shape to form a semiconductor film 1204a and a semiconductor film 1204b. A gate insulating film 1205 is formed so as to cover the semiconductor film 1204a and the semiconductor film 1204b (see FIG. 5B).

An example of a step for forming the semiconductor film 1204a and the semiconductor film 1204b is briefly described hereinafter. First, an amorphous semiconductor film, for example, an amorphous silicon film is formed. After the amorphous semiconductor film is coated with a solution containing nickel that is a metal element for promoting crystallization, the amorphous semiconductor film is subjected to dehydrogenation treatment (at 500° C. for one hour) and thermal crystallization treatment (at 550° C. for four hours), to form a crystalline semiconductor film. Then, if necessary, laser light irradiation from a laser is performed and a photolithography method is used to form the semiconductor film 1204a and the semiconductor film 1204b, depending on degrees of the crystallization. It is to be noted that without conducting the thermal crystallization which uses the metal element for promoting crystallization, the amorphous semiconductor film may be crystallized only by laser light irradiation.

Alternatively, the semiconductor film 1204a and the semiconductor film 1204b may be formed by irradiating a semiconductor film with continuous-wave laser light or a laser light oscillated at a frequency of 10 MHz or more and scanning in one direction for crystallization. In the case of such crystallization, crystals grow in the scanning direction of the laser light. A transistor may be arranged such that the scanning direction is in accordance with the channel length direction (a direction in which carriers flow when a channel formation region is formed).

Then, the gate insulating film 1205 is formed to cover the semiconductor film 1204a and the semiconductor film 1204b. The gate insulating film 1205 is formed to have a single-layer structure or a stacked-layer structure of a film containing oxide of silicon or nitride of silicon by a CVD method, a sputtering method, or the like. Specifically, a single layer structure or a stacked-layer structure that includes any of a silicon oxide film, a silicon oxynitride film, and/or a silicon nitride oxide film is formed.

Alternatively, the gate insulating film 1205 may be formed by performing plasma treatment to the semiconductor film 1204a and the semiconductor film 1204b to oxidize or nitride the surface thereof. For example, the gate insulating film 1205 is formed by plasma treatment with a mixed gas of a rare gas such as He, Ar, Kr, and Xe, and oxygen, nitrogen oxide ($NO_2$), ammonia, nitrogen, hydrogen, or the like. When excitation of the plasma in this case is performed by using microwaves, plasma with a low electron temperature and a high density can be generated. With an oxygen radical (that may include an OH radical) or an nitrogen radical (that may include an NH radical) generated by a high-density plasma, oxidizing or nitriding of the surface of the semiconductor film can be conducted.

By such high-density plasma treatment, an insulating film with a thickness of about 1 nm to 20 nm, inclusive, typically about 5 nm to 10 nm, inclusive, is formed on the semiconductor films. Since the reaction in this case is a solid-phase reaction, interface state density between the insulating film and the semiconductor films can be quite low. Since such high-density plasma treatment oxidizes (or nitrides) a semiconductor film (crystalline silicon, or polycrystalline silicon) directly, unevenness of a thickness of the insulating film to be formed can be extremely small. In addition, oxidation does not progress even in a crystal grain boundary of crystalline silicon, which makes a very preferable condition. In other words, by conducting solid phase oxidization on a surface of the semiconductor film by high-density plasma treatment described here, an insulating film with favorable uniformity and low interface state density can be formed without conducting oxidation reaction extraordinarily in a crystal grain boundary.

As the gate insulating film 1205, only the insulating film formed by plasma treatment may be used, or a stacked-layer film of the insulating film formed by plasma treatment and an insulating film of silicon oxide, silicon oxynitride, silicon nitride, or the like stacked by a CVD method using plasma or thermal reaction may be used. In either case, a transistor is preferably formed to have a gate insulating film, which partly or entirely includes an insulating film formed by plasma treatment because characteristic variations can be reduced.

In a case where the semiconductor film 1204a and the semiconductor film 1204b are formed by irradiating a semiconductor film with continuous-wave laser light or laser light oscillated at a frequency of 10 MHz or more and scanning in one direction for crystallization, by combining them with a gate insulating film on which the plasma treatment is performed, a thin film transistor (TFT) with reduced characteristic variations and a high field effect mobility can be obtained.

Then, a conductive film is formed over the gate insulating film 1205. Here, a single-layer conductive film with a thickness of about 100 nm to 500 nm, inclusive, is formed. The conductive film can be formed using an element selected from tantalum (Ta), tungsten (W), titanium (Ti), molybdenum (Mo), aluminum (Al), copper (Cu), chromium (Cr), niobium (Nb), and the like; an alloy material mainly containing the element; or a compound material mainly containing the element. Alternatively, a semiconductor material typified by polycrystalline silicon added with an impurity element such as phosphorus may be used. In a case where the conductive film is formed to have a stacked-layer structure, for example, a stacked-layer structure of a tantalum nitride film and a tungsten film, of a tungsten nitride film and a tungsten film, or of a molybdenum nitride film and a molybdenum film can be used. For example, a stacked-layer structure of a tantalum nitride film having a thickness of 30 nm and a tungsten film having a thickness of 150 nm can be used. Since tungsten and tantalum nitride have high thermal resistance, thermal treatment for thermal activation can be performed after the conductive film is formed. In addition, the conductive film may further have a three-layer structure; for example, a stacked-layer structure of a molybdenum film, an aluminum film, and a molybdenum film may be used.

Next, a resist mask is formed by a photolithography method, and etching treatment for forming gate electrodes and a gate wiring is performed to form gate electrodes 1207 above the semiconductor film 1204a and the semiconductor film 1204b.

Next, a resist mask is formed by a photolithography method, and an impurity element imparting n-type conductivity or p-type conductivity is added to the semiconductor film 1204a and the semiconductor film 1204b at low concentration by an ion doping method or an ion implantation method. In this embodiment, an impurity element imparting n-type conductivity is added to the semiconductor film 1204a and the semiconductor film 1204b at a low concentration. As the impurity element imparting n-type conductivity, an element belonging to Group 15 may be used; for example, phosphorus (P) or arsenic (As) may be used. As the impurity element imparting p-type conductivity, an element belonging to Group 13 may be used; for example, boron (B) may be used.

In this embodiment, a structure using only an n-type TFT is shown for simplification; however, an embodiment of the present invention is not interpreted as being limited thereto. A structure using only a p-type TFT can also be employed. Alternatively, a structure using both an n-type TFT and a p-type TFT can also be used. In a case where both an n-type TFT and a p-type TFT are used, a mask is formed to cover a semiconductor layer to be included in the p-type TFT later and an impurity element imparting n-type is added thereto, and a mask is formed to cover a semiconductor layer to be included in the n-type TFT later and an impurity element imparting p-type conductivity is added thereto, so that the impurity element imparting n-type conductivity and the impurity element imparting p-type conductivity can be added as selected.

Next, an insulating film is formed to cover the gate insulating film 1205 and the gate electrodes 1207. The insulating film is formed in a single layer or stacked layers by depositing a film containing an inorganic material such as silicon, silicon oxide, or silicon nitride, or a film containing an organic material such as an organic resin by a plasma CVD method, a sputtering method, or the like. Then, the insulating film is selectively etched by anisotropic etching (etching mainly in a perpendicular direction), so that insulating films (also referred to as sidewalls) 1208 that are in contact with the side surfaces of the gate electrodes 1207 are fowled. The insulating films 1208 are later used as masks for adding an impurity element when a lightly doped drain (LDD) region is formed.

Figure 5C:
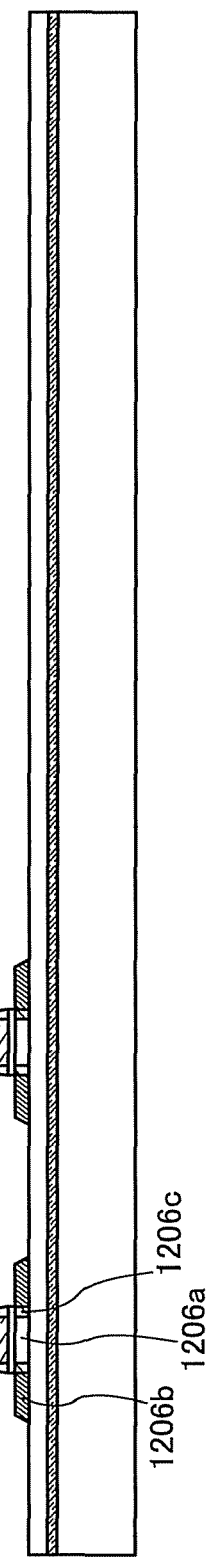

Then, a resist mask formed by a photolithography method and the gate electrodes 1207 and the insulating films 1208 are used as masks to add an impurity element imparting n-type conductivity to the semiconductor film 1204a and the semiconductor film 1204b. Through this step, channel formation regions 1206a, first impurity regions 1206b, second impurity regions 1206c are formed (see FIG. 5C). The first impurity regions 1206b serve as source and drain regions of the thin film transistor, and the second impurity regions 1206c serve as LDD regions. The concentration of the impurity element in each second impurity region 1206c is lower than that in each first impurity region 1206b.

Next, an insulating film is formed to have a single-layer structure or a stacked-layer structure so as to cover the gate electrodes 1207, the insulating films 1208, and the like. In this embodiment, a three-layer structure of insulating films 1209, 1210, and 1211 is described. The insulating films can be formed by a CVD method. A silicon oxynitride film having a thickness of 50 nm can be formed as the insulating film 1209. A silicon nitride oxide film having a thickness of 200 nm can be formed as the insulating film 1210. A silicon oxynitride film having a thickness of 400 nm can be formed as the insulating film 1211. Surfaces of these insulating layers are formed in accordance with surface shapes of layers formed thereunder, depending on thicknesses. That is, since the insulating film 1209 is thin, its surface is in almost exact accordance with to the surface shape of the gate electrodes 1207. Since the surface shape becomes almost planar as the thickness becomes large, the insulating film 1211, which is the thickest among the three-layer structure, has an almost planar surface shape. However, unlike an organic material, the insulating film 1211 does not have a planar surface shape. When the surface shape needs to be planar, an organic material such as polyimide, polyamide, benzocyclobutene, acrylic, or epoxy; a siloxane material; or the like can be used. In addition to a CVD method, these insulating films can be formed by a sputtering method, an SOG method, a droplet discharge method, a screen-printing method, or the like.

The insulating films 1209, 1210, and 1211 are etched by a photolithography method to form contact holes reaching the first impurity regions 1206b, and then, conductive films 1231a serving as a source or a drain of the thin film transistor and a conductive film 1231b serving as a connection wiring are formed. The conductive films 1231a and 1231b are formed by filling the contact holes and etching the conductive films selectively. It is to be noted that before the conductive films are formed, a silicide may be formed over the surfaces of the semiconductor film 1204a and the semiconductor film 1204b that are exposed by the contact holes so that the resistance can be reduced. The conductive films 1231a and 1231b are preferably formed using a low resistance material in order to reduce signal delay. Since a low resistance material often has low heat resistance, a high heat-resistant material is preferably provided over and below the low resistance material; for example, aluminum film may be formed to a thickness of 300 nm as a low resistance material, and titanium film may be formed to a thickness of 100 nm both over and below the aluminum film. The conductive film 1231b serving as the connection wiring can be formed to have the same stacked structure as the conductive film 1231a so that resistance of the connection wiring can be reduced and heat resistance thereof can be improved. The conductive films 1231a and 1231b can be formed of an element selected from tungsten (W), tantalum (Ta), molybdenum (Mo), nickel (Ni), platinum (Pt), copper, (Cu), gold (Au), silver (Ag), manganese (Mn), niobium (Nb), carbon (C), silicon (Si), or an alloy material or a compound material which includes any of these elements as a main component, and has a single-layer structure or a stacked-layer structure. An alloy material containing aluminum as a main component corresponds to, for example, a material that contains aluminum as a main component and which also contains nickel, or an alloy material that contains aluminum as a main component and that also contains nickel and either or both carbon or/and silicon. The conductive films 1231a and 1231b can be formed by a CVD method, a sputtering method, or the like.

From the above, an element layer 1249 including a thin film transistor 1230a and a thin film transistor 1230b can be obtained (see FIG. 6A).

Note that heat treatment may be performed for recovering the crystallinity of the semiconductor film 1204a and the semiconductor film 1204b, activating the impurity element added to the semiconductor film 1204a and the semiconductor film 1204b, and hydrogenating the semiconductor film 1204a and the semiconductor film 1204b before the insulating films 1209, 1210, and 1211 are formed, after the insulating film 1209 is formed, or after the insulating films 1209 and 1210 are formed. For the heat treatment, a thermal annealing method, a laser annealing method, an RTA method, or the like may be employed.

Next, insulating films 1212 and 1213 are formed so as to cover the conductive films 1231a and 1231b (see FIG. 6B). Here is an example in which a silicon nitride film having a thickness of 100 nm is used as the insulating film 1212 and a polyimide film having a thickness of 1500 nm is used as the insulating film 1213. A surface shape of the insulating film 1213 preferably has high planarity. The surface shape of the insulating film 1213 can have higher planarity in a case where polyimide is used because of a feature of an organic material, and the film is formed to have a large thickness of, for example, from 750 nm to 3000 nm, inclusive (specifically, 1500 nm). An opening is formed in the insulating films 1212 and 1213. In this embodiment, an example in which an opening 1214 to expose the conductive film 1231b is described. In the opening 1214 (specifically, in a region 1215 that is surrounded by a dotted line), an end portion of the insulating film 1212 is covered with an insulating film 1213. The end portion of the insulating film 1212 that is a lower layer is covered with the insulating film 1213 that is an upper layer so that disconnection of a wiring to be formed later in the opening 1214 can be prevented. In this embodiment, since polyimide, which is an organic material, is used for the insulating film 1213, in the opening 1214, the insulating film 1213 can have a gently tapered shape and disconnection can be efficiently prevented. Materials for the insulating film 1213 that can prevent disconnection include organic materials such as benzocyclobutene, acrylic, or epoxy; a siloxane material; and the like in addition to polyamide. A silicon oxynitride film or a silicon nitride oxide film can be used for the insulating film 1213, instead of the silicon nitride film. In addition, the insulating films 1212 and 1213 may be formed by a CVD method, a sputtering method, an SOG method, a droplet discharge method, a screen-printing method, or the like.

Next, a conductive film 1217 is formed over the insulating film 1213 and an insulating film 1218 is formed over the conductive film 1217 (see FIG. 6C). The conductive film 1217 can be formed using the same material as the conductive films 1231a and 1231b; for example, a stacked structure of a titanium film having a thickness of 100 nm, an aluminum film having a thickness of 200 nm, and a titanium film having a thickness of 100 nm can be employed. The conductive film 1217 is connected to the conductive film 1231*b* in the opening 1214. The titanium films are in contact with each other and the contact resistance can be suppressed. The conductive film 1217 preferably has a low wiring resistance because a current in accordance with a signal between the thin film transistor and an antenna (that is formed later) flows in the conductive film 1217. Thus, a low resistance material such as aluminum may be used. The conductive film 1217 can be formed of an element selected from tungsten (W), tantalum (Ta), molybdenum (Mo), nickel (Ni), platinum (Pt), copper, (Cu), gold (Au), silver (Ag), manganese (Mn), niobium (Nb), carbon (C), silicon (Si), or an alloy material or a compound material which includes any of these elements as a main component, and has a single-layer structure or a stacked-layer structure. An alloy material containing aluminum as a main component corresponds to, for example, a material which contains aluminum as a main component and which also contains nickel, or an alloy material which contains aluminum as a main component and which also contains nickel and either or both carbon or/and silicon. The conductive film 1217 can be formed by a CVD method, a sputtering method, or the like. Because the insulating film 1218 needs to have a planar surface shape, it is preferably formed using an organic material. Here is an example in which a polyimide film having a thickness of 2000 nm is used. The insulating film 1218 is formed to a thickness of 2000 nm, which is larger than the thickness of the insulating film 1213 because unevenness of a surface of the opening 1214 in the insulating film 1213 having a thickness of 1500 nm, and of the conductive film 1217 formed in the opening 1214 should to be planar. Thus, the insulating film 1218 may have a thickness 1.1 to 2 times, preferably, 1.2 to 1.5 times the thickness of the insulating film 1213. In a case where the insulating film 1213 has a thickness of from 750 nm to 3000 nm, inclusive, the insulating film 1218 preferably has a thickness of from 900 nm to 4500 nm, inclusive. A material having higher planarity may be used for the insulating film 1218, taking thought of the thickness. Materials having high planarity that can be used for the insulating film 1218 include an organic material such as polyamide, benzocyclobutene, acrylic, or epoxy; a siloxane material; and the like in addition to polyimide. In a case where an antenna is formed over the insulating film 1218, the planarity of a surface of the insulating film 1218 needs to be considered.

In addition, the insulating film 1218 is preferably used to cover an end portion of the insulating film 1213 outside the antenna in a circuit portion (not illustrated). In a case where the insulating film 1218 covers the insulating film 1213, the end portion of the insulating film 1218 is preferably located to have a margin from the outside, which is two or more times as long as the total thickness of the insulating film 1213 and the insulating film 1218. In this embodiment, the insulating film 1213 is formed to a thickness of 1500 nm and the insulating film 1218 is formed to a thickness of 2000 nm; thus, the insulating film 1218 covering the end portion of the insulating film 1213 is located to have a distance (d=7000 nm) from the end of the insulating film 1213. With the above structure, a margin for processing is secured and the entry of moisture or oxygen is also expected to be prevented.

Figure 7:
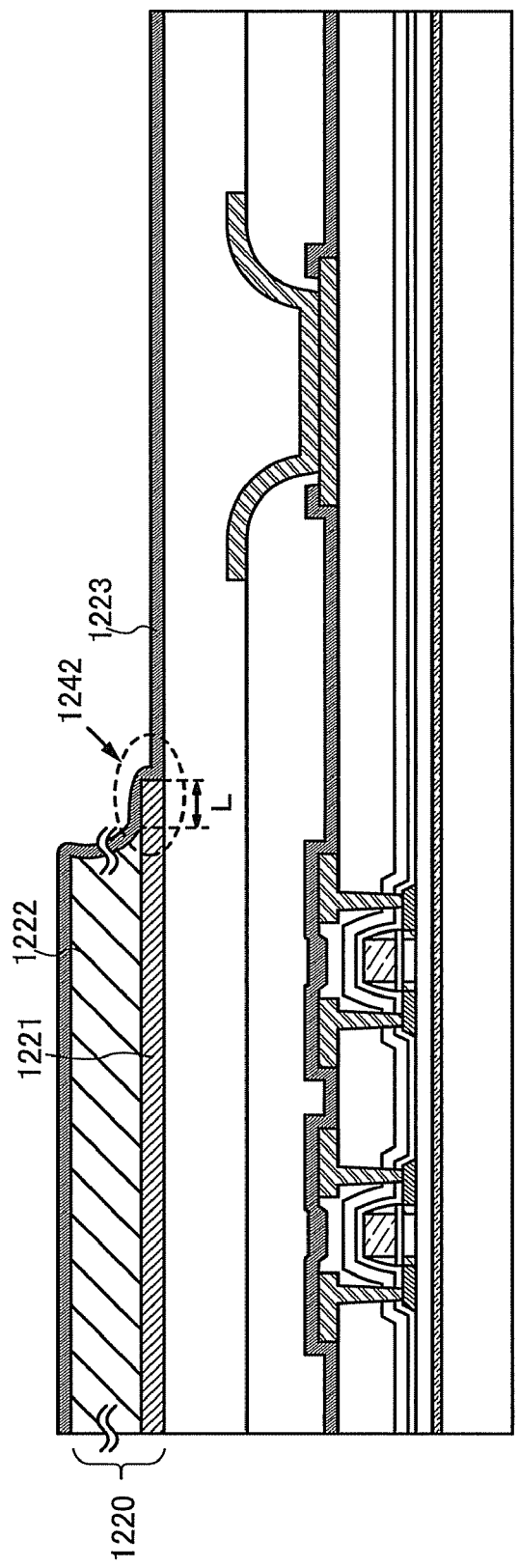
FIG. 7 illustrates an example of manufacturing steps of a semiconductor device.

Next, an antenna 1220 is formed over the insulating film 1218 (see FIG. 7). The antenna 1220 and the conductive film 1217 are electrically connected to each other through an opening. The opening is formed below the antenna 1220 to be integrated. Note that the antenna 1220 may be directly connected to the conductive film 1231*a*; however, it is preferable to provide the conductive film 1217 as in this embodiment because the margin for forming the opening to be connected to the antenna 1220 can be secured, resulting in high integration. Accordingly, another conductive film may be further provided over the conductive film 1217 to be connected to the antenna 1220. That is, the antenna 1220 may be electrically connected to the conductive film 1231*a* included in the thin film transistor and a connection structure in which a plurality of conductive films are interposed between the antenna 1220 and the conductive film 1231*a* can realize the high integration. The plurality of conductive films including the conductive film 1217 preferably have a small thickness because the thickness of the semiconductor device becomes large if the thickness of the conductive films are large. Thus, the conductive film 1217 and the like preferably have a small thickness as compared to the conductive film 1231*a*.

The antenna 1220 can employ a stacked structure of a first conductive film 1221 and a second conductive film 1222. This embodiment shows a stacked structure of a titanium film having a thickness of 100 nm and an aluminum film having a thickness of 5000 nm. Titanium can increase moisture resistance of the antenna and adhesiveness between the insulating film 1218 and the antenna 1220. Further, titanium can reduce contact resistance with the conductive film 1217 because the titanium film formed as the uppermost layer of the conductive film 1217 is in contact with the titanium in the antenna, that is, the same material is in contact with each other. As a result of forming such a titanium film by a dry etching method, the end portion tends to be sheer. Since aluminum is a low resistance material, it is suitable for an antenna. The resistance can be further reduced by forming the thick aluminum film. The resistance of the antenna is preferably low so that the communication distance can be longer. As a result of forming such an aluminum film by a wet etching method, sidewalls in the end portion tends to be tapered. In the tapered shape in this embodiment, the aluminum film is depressed toward inside. The wet etching is performed on the aluminum film such that an end portion of the aluminum film is inside of the end portion of the titanium film (a region 1242). The end portion of the aluminum film may be formed inside of the end portion of the titanium film, and the distance (a distance L) between the end of the aluminum film and that of the titanium film is preferably in a range of one-sixth to one-half the thickness of the aluminum film. In this embodiment, the end portion of the aluminum film may be formed inside of the titanium film, and the distance L between the end portion of the aluminum film and that of the titanium film may be in a range of from 0.8 µm to 2 µm, inclusive. A structure where the end portion of the titanium film projects from that of the aluminum film can prevent disconnection of an insulating film that is formed later, resulting in enhancing durability of the antenna.

The antenna can be formed of, in addition to titanium and aluminum, an element selected from silver, copper, gold, platinum, nickel, palladium, tantalum, molybdenum, and the like, or an alloy material or a compound material which includes any of these elements. The antenna can be formed by a CVD method, a sputtering method, a printing method such as a screen printing method or a gravure printing method, a droplet discharge method, a dispenser method, a plating method, or the like. In this embodiment, a stacked structure is shown as an example; however, the antenna may be formed to have a single-layer structure using any one of the above materials.

An insulating film 1223 is formed so as to cover the antenna 1220. In this embodiment, a silicon nitride film of 200 nm is formed as the insulating film 1223. The insulating film 1223 is preferably formed because it enhances a moisture resistance of the antenna. Since the end portion of the titanium film projects from the aluminum film, the insulating film 1223 can be formed without disconnections. In addition to a silicon nitride film, a silicon oxynitride film, a silicon nitride oxide film, other inorganic material can be used for the insulating film 1223.

In the above manner, a semiconductor integrated circuit that is formed using an insulating substrate can be completed.

This embodiment can be implemented in combination with any of the other embodiments as appropriate.

Embodiment 6

In this embodiment, a method for manufacturing a semiconductor device with a higher reliability and a high yield is described with reference to FIGS. 9A to 9D. In this embodiment, a CMOS (complementary metal oxide semiconductor) is described as an example of the semiconductor device.

Figure 9A:
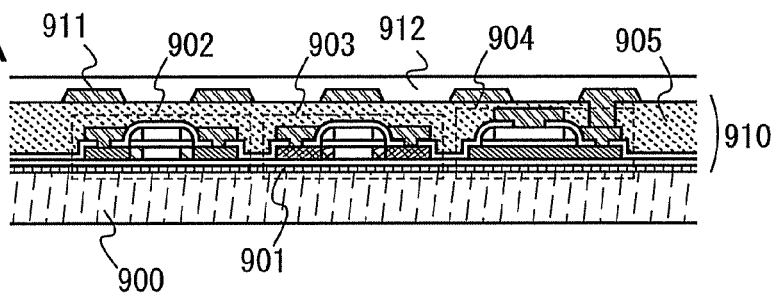
FIGS. 9A to 9D illustrate an example of manufacturing steps of a semiconductor device.
Figure 9B:
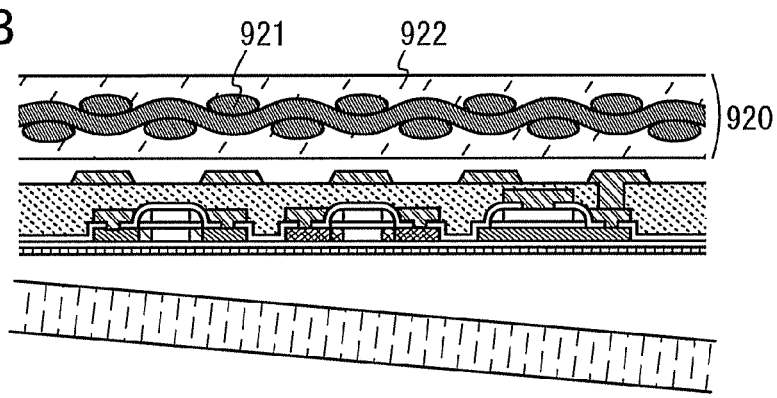
Figure 9C:
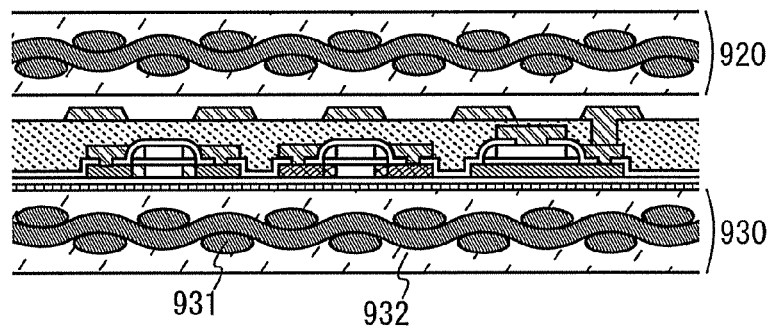
Figure 9D:
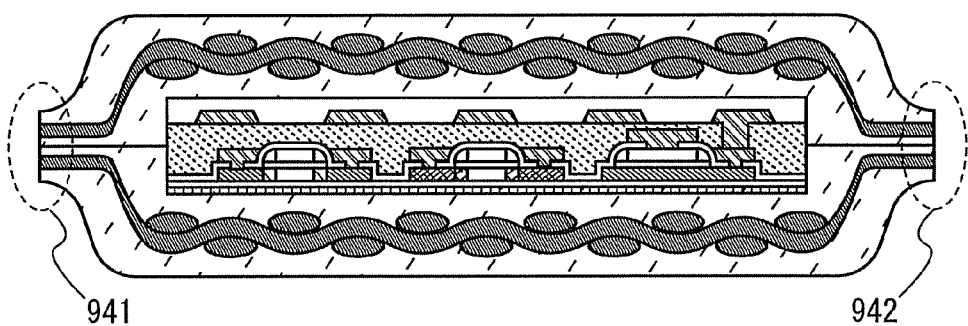
Figure 10A:
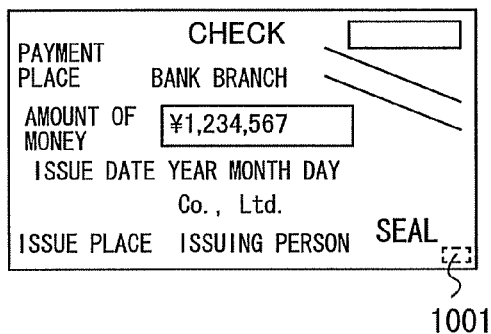
FIGS. 10A to 10G illustrate applications of RFID tags each using a regulator circuit according to an embodiment of the present invention.
Figure 10B:
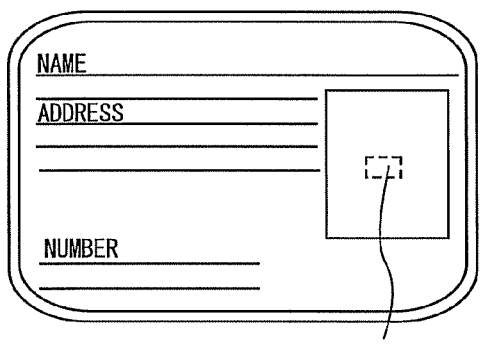
Figure 10C:
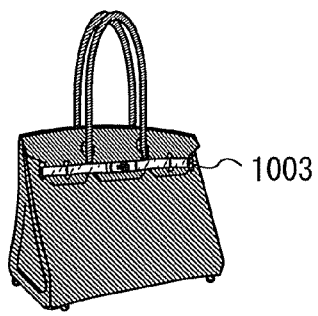
Figure 10D:
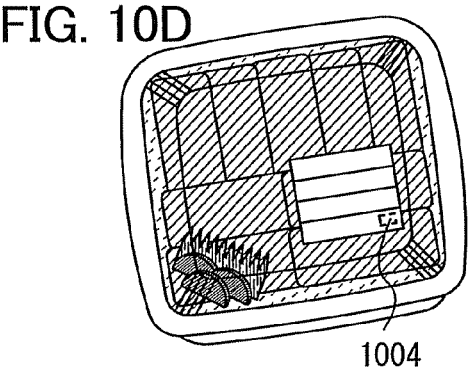
Figure 10E:
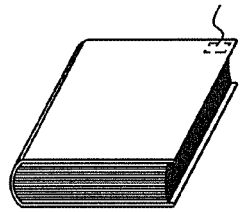
Figure 10F:
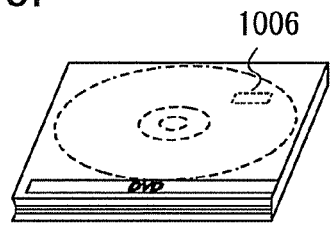
Figure 10G:
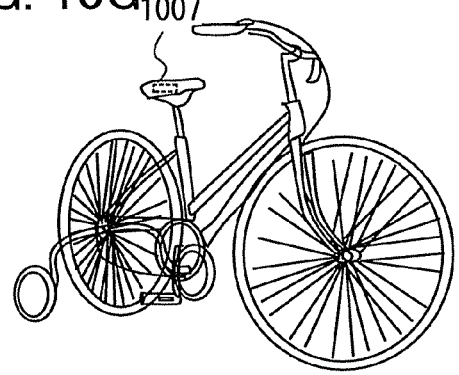

Over a formation substrate 900, transistors 902 and 903, a capacitor 904, an insulating layer 905 are provided with a separation layer 901 interposed therebetween, and a semiconductor integrated circuit 910 is formed (see FIG. 9A).

The transistors 902 and 903 are thin film transistors. They each include a source region, a drain region, a low-concentration impurity region, a channel formation region, a gate insulating layer, a gate electrode, a source electrode, and a drain electrode. The source and drain regions are in contact with wirings serving as the source and drain electrodes, respectively, and electrically connected thereto.

The transistor 902 is an n-channel transistor and includes an impurity element imparting n-type conductivity, such as phosphorus (P) or arsenic (As), in the source and drain regions and the low-concentration impurity region. The transistor 903 is a p-channel transistor and includes an impurity element imparting p-type conductivity, such as boron (B), aluminum (Al), or gallium (Ga), in the source and drain regions and the low-concentration impurity region.

The capacitor 904 is formed in a process similar to the transistors 902 and 903. One electrode of the capacitor 904 is formed of a semiconductor layer, and the other electrode is formed of a gate electrode. Here, an impurity element may be added to the semiconductor layer to be the capacitor 904 before the formation of a layer of the gate electrode in order to secure a capacitance value effectively. Through this process, the semiconductor layer arranged in a region in a lower layer of the layer of the gate electrode is also added with an impurity element, and the capacitor 904 can serve as a capacitor effectively.

Then, an antenna 911 formed of a conductive film is formed on the insulating layer 905 and a protective film 912 is formed on the antenna 911. The antenna 911 is electrically connected to the semiconductor integrated circuit. In FIG. 9A, the antenna 911 is electrically connected to one electrode of the capacitor 904.

An insulator 920 is formed on the protective film 912 subsequently. A structure body in which a fibrous body 921 is impregnated with an organic resin 922 may be used as the insulator 920, for example.

After the protective film 912 and the insulator 920 are bonded to each other, the semiconductor integrated circuit 910, the antenna 911, and the protective film 912 are separated from the substrate 900 at the interface of the separation layer 901. Therefore, the semiconductor integrated circuit 910, the antenna 911, and the protective film 912 are provided on the insulator 920 side (see FIG. 9B).

An adhesive may be used to bond the protective film 912 and the insulator 920, although not illustrated. Alternatively, pressure bonding or heat pressure bonding may be performed.

Then, on a side of the separation surface that is exposed, the semiconductor integrated circuit 910 and an insulator 930 are bonded to each other with the separation layer 901 interposed therebetween. Thus, the semiconductor integrated circuit 910, the antenna 911, and the protective film 912 are interposed between the insulator 920 and the insulator 930 (see FIG. 9C).

A structure body in which a fibrous body 931 is impregnated with an organic resin 932 may be used as the insulator 930, for example, as in the case of the insulator 920.

Although not particularly illustrated, a number of structure bodies including a plurality of the semiconductor integrated circuits 910, the antennas 911, the protective films 912 are arranged in a plane direction and interposed between the insulator 920 and the insulator 930. By separating each of the structure bodies including the plurality of the semiconductor integrated circuits 910, the antennas 911, the protective films 912, a semiconductor integrated circuit chip each including a structure in which the semiconductor integrated circuit 910, the antenna 911, and the protective film 912 are interposed between the insulator 920 and the insulator 930 can be fabricated. There is no particular limitation on a separation means as long as physical separation is possible. In this embodiment, the separation is performed by laser light irradiation along a separation line as a preferable example.

With the laser light irradiation for the separation, the insulator 920 and the insulator 930 are fused on separation surfaces 941 and 942 of the semiconductor integrated circuit chip, and are welded to each other. Thus, each of the semiconductor integrated circuit chips has a structure in which the semiconductor integrated circuit 910, the antenna 911, and the protective film 912 are sealed entirely by the insulator 920 and the insulator 930.

Although not particularly illustrated here, another insulator may be further provided outside or inside the insulator 920 and the insulator 930 so that the semiconductor integrated circuit 910, the antenna 911, and the protective film 912 are covered entirely more favorably.

Through the above process in which insulators are provided with a semiconductor integrated circuit interposed therebetween, adverse effects such as damage of the semiconductor integrated circuit or defects in characteristics by an external stress or internal stress can be prevented. Thus, a semiconductor device can be manufactured with a higher reliability and a high yield.

Note that the semiconductor device manufactured in this embodiment can have flexibility with the use of a flexible insulator.

As a material for the semiconductor layer included in the transistors 902 and 903 and the capacitor 904, an amorphous semiconductor (hereinafter also referred to as "AS") that can be formed by a vapor growth method or a sputtering method using a semiconductor material gas typified by silane or germane, a polycrystalline semiconductor that is formed by crystallizing the amorphous semiconductor by utilizing light energy or thermal energy, a microcrystalline semiconductor (semiamorphous or microcrystal, hereinafter also referred to as "SAS"), or the like can be used. The semiconductor layer can be formed by a sputtering method, an LPCVD method, a plasma CVD method, or the like.

Note that the microcrystalline semiconductor film belongs to a metastable state which is an intermediate between an amorphous state and a single crystal state according to Gibbs free energy. That is, the microcrystalline semiconductor is a semiconductor having a third state which is stable in terms of free energy and has a short range order and lattice distortion. In the microcrystalline semiconductor, columnar-like or needle-like crystals grow in a normal direction with respect to a surface of a substrate. The Raman spectrum of microcrystalline silicon, which is a typical example of a microcrystalline semiconductor, is shifted to a small wavenumber region below 520 cm$^{-1}$ which represents single-crystalline silicon. That is, the peak of the Raman spectrum of the microcrystalline silicon exists between 520 cm$^{-1}$ which represents single-crystalline silicon and 480 cm$^{-1}$ which represents amorphous silicon. The microcrystalline semiconductor includes at least 1 at. % or more of hydrogen or halogen to terminate a dangling bond. Moreover, a rare gas element such as helium, argon, krypton, or neon may be included to further promote lattice distortion, so that stability is enhanced and a favorable microcrystalline semiconductor film can be obtained.

The microcrystalline semiconductor film can be formed by a high-frequency plasma CVD method with a frequency of several tens to several hundreds of MHz or a microwave plasma CVD method with a frequency of 1 GHz or more. Typically, the microcrystalline semiconductor film can be formed by using a gas obtained by diluting a silicon hydride such as SiH$_4$, Si$_2$H$_6$, SiH$_2$Cl$_2$, SiHCl$_3$, SiCl$_4$, SiF$_4$, or the like, with hydrogen. Additionally, the microcrystalline semiconductor film can be formed by using a gas containing a silicon hydride and hydrogen which is diluted by one or more of rare gas elements selected from helium, argon, krypton, and neon. In this case, the flow rate of hydrogen is set to be greater than or equal to 5 times and less than or equal to 200 times, preferably greater than or equal to 50 times and less than or equal to 150 times, much more preferably 100 times as much as that of silicon hydride.

Hydrogenated amorphous silicon can be typically exemplified as the amorphous semiconductor, while polysilicon (polycrystalline silicon) or the like can be typically exemplified as a crystalline semiconductor. Examples of polysilicon include so-called high-temperature polysilicon that contains polysilicon as a main component and is formed at a process temperature greater than or equal to 800° C., so-called low-temperature polysilicon that contains polysilicon as a main component and is formed at a process temperature less than or equal to 600° C., polysilicon obtained by crystallizing amorphous silicon by using an element that promotes crystallization or the like, and the like. Note that as mentioned above, a microcrystalline semiconductor or a semiconductor containing a crystal phase in part of a semiconductor layer may be used.

As a material of the semiconductor, as well as an element of silicon (Si), germanium (Ge), or the like, a compound semiconductor such as GaAs, InP, SiC, ZnSe, GaN, SiGe, or the like can be used. Alternatively, an oxide semiconductor such as zinc oxide (ZnO), tin oxide (SnO$_2$), magnesium zinc oxide, gallium oxide, indium oxide, an oxide semiconductor formed of a plurality of the above oxide semiconductors, and the like may be used. For example, an oxide semiconductor formed of zinc oxide, indium oxide, and gallium oxide may be used. In the case of using zinc oxide for the semiconductor layer, a gate insulating layer is preferably formed using Y$_2$O$_3$, Al$_2$O$_3$, TiO$_2$, a stacked layer of any of the above substances, or the like. For a gate electrode layer, a source electrode layer, and a drain electrode layer, ITO, Au, Ti, or the like is preferably used. In addition, ZnO can be added with In, Ga, or the like.

In the case of using a crystalline semiconductor layer for the semiconductor layer, the crystalline semiconductor layer may be formed by any of various methods (such as a laser crystallization method, a thermal crystallization method, a thermal crystallization method using an element promoting crystallization such as nickel). Also, a microcrystalline semiconductor, which is an SAS, can be crystallized by being irradiated with laser light to increase its crystallinity. In a case where an element which promotes crystallization is not used, before the amorphous silicon film is irradiated with a laser light, the amorphous silicon film is heated at 500° C. for one hour in a nitrogen atmosphere to reduce a hydrogen concentration in the amorphous silicon film to less than or equal to 1×10$^{20}$ atoms/cm$^3$. This is because, if the amorphous silicon film contains much hydrogen, the amorphous silicon film may be destroyed by laser light irradiation.

Any method can be used for introducing a metal element into the amorphous semiconductor layer as long as the method allows the metal element to exist on the surface of or inside the amorphous semiconductor layer. For example, a sputtering method, a CVD method, a plasma process method (including a plasma CVD method), an adsorption method, or a method of applying a solution of a metal salt can be used. Among the above-mentioned methods, the method using a solution is convenient and has an advantage of easily adjusting the concentration of a metal element. It is preferable to form an oxide film by UV light irradiation in an oxygen atmosphere, a thermal oxidation method, treatment with ozone water or hydrogen peroxide including a hydroxyl radical, or the like in order to improve wettability of the surface of the amorphous semiconductor layer and to spread the aqueous solution over the entire surface of the amorphous semiconductor layer.

The crystallization may be performed by adding an element which promotes crystallization (also referred to as a catalyst element or a metal element) to an amorphous semiconductor layer and performing a heat treatment (at 550° C. to 750° C. for 3 minutes to 24 hours) in a crystallization step in which the amorphous semiconductor layer is crystallized to form a crystalline semiconductor layer. As the element which promotes (accelerates) the crystallization, one or more of elements selected from iron (Fe); nickel (Ni), cobalt (Co), ruthenium (Ru), rhodium (Rh), palladium (Pd), osmium (Os), iridium (Ir), platinum (Pt), copper (Cu), and gold (Au) can be used.

In order to remove or reduce the element that promotes crystallization from the crystalline semiconductor layer, a semiconductor layer containing an impurity element is formed in contact with the crystalline semiconductor layer and is made to function as a gettering sink. The impurity element may be an impurity element imparting n-type conductivity, an impurity element imparting p-type conductivity, a rare gas element, or the like. For example, one or more of elements selected from phosphorus (P), nitrogen (N), arsenic (As), antimony (Sb), bismuth (Bi), boron (B), helium (He), neon (Ne), argon (Ar), krypton (Kr), and xenon (Xe) can be used. The semiconductor layer containing a rare-gas element is formed in the crystalline semiconductor layer containing the element that promotes crystallization, and heat treatment (at 550° C. to 750° C. for 3 minutes to 24 hours) is performed. The element that promotes crystallization in the crystalline semiconductor layer is transported to the semiconductor layer containing the rare-gas element; thus, the element that promotes crystallization in the crystalline semiconductor layer is removed or reduced. After that, the semiconductor layer containing the rare-gas element serving as the gettering sink is removed.

In addition, thermal treatment and laser light irradiation may be combined to crystallize the amorphous semiconductor layer. The thermal treatment and/or the laser light irradiation may be independently performed a plurality of times.

In addition, a crystalline semiconductor layer may be directly formed over a substrate by a plasma treatment method. Alternatively, the crystalline semiconductor layer may be selectively formed over a substrate by using a plasma treatment method.

The gate insulating layer may be formed of silicon oxide or a stacked structure of silicon oxide and silicon nitride. The gate insulating layer may be formed by a plasma CVD method or a low pressure CVD method or may be formed by depositing an insulating layer by solid phase oxidation or solid phase nitridation by plasma treatment. This is because a gate insulating layer formed by oxidation or nitridation of a single crystal semiconductor layer by plasma treatment is dense, has a high withstand voltage, and is excellent in reliability. For example, a surface of the semiconductor layer is oxidized or nitrided using nitrous oxide ($N_2O$) diluted with Ar by 1 to 3 times (flow ratio) by application of a microwave (2.45 GHz) power of 3 to 5 kW at a pressure of 10 to 30 Pa. By this process, an insulating film having a thickness of 1 nm to 10 nm (preferably 2 nm to 6 nm) is formed. Further, nitrous oxide ($N_2O$) and silane ($SiH_4$) are introduced, and a silicon oxynitride film is formed by a vapor deposition method by application of a microwave (2.45 GHz) power of 3 to 5 kW at a pressure of 10 to 30 Pa; thus, the gate insulating layer is formed. The combination of the solid phase reaction and the reaction by the vapor deposition method can form a gate insulating layer with a low interface state density and an excellent withstand voltage.

As the gate insulating layer, a high permittivity material such as zirconium dioxide, hafnium oxide, titanium dioxide, or tantalum pentoxide may also be used. When a high permittivity material is used for the gate insulating layer, a gate leak current can be reduced.

The gate electrode layer can be formed by a CVD method, a sputtering method, a droplet discharge method, or the like. The gate electrode layer may be formed of an element selected from Ag, Au, Cu, Ni, Pt, Pd, Ir, Rh, W, Al, Ta, Mo, Cd, Zn, Fe, Ti, Si, Ge, Zr, and Ba; or an alloy material or a compound material containing any of the elements as a main component. Alternatively, a semiconductor film typified by a polycrystalline silicon film doped with an impurity element such as phosphorus, or AgPdCu alloy may be used. Further, either a single-layer structure or a multi-layer structure may be employed; for example, a two-layer structure of a tungsten nitride film and a molybdenum film may be employed or a three-layer structure in which a tungsten film with a thickness of 50 nm, a film of an aluminum-silicon alloy (Al—Si) with a thickness of 500 nm, and a titanium nitride film with a thickness of 30 nm are stacked in this order may be employed. In the case of the three-layer structure, a tungsten nitride film may be used instead of the tungsten film as the first conductive film, an aluminum-titanium alloy (Al—Ti) film may be used instead of the aluminum-silicon alloy (Al—Si) film as the second conductive film, and a titanium film may be used instead of the titanium nitride film as the third conductive film.

A light-transmitting material having a property of transmitting visible light can also be used for the gate electrode layer. Light-transmitting conductive materials include indium tin oxide (ITO), indium tin oxide containing silicon oxide (ITSO), organic indium, organic tin, zinc oxide, and the like. Alternatively, indium zinc oxide (IZO) containing zinc oxide (ZnO), zinc oxide (ZnO), ZnO doped with gallium (Ga), tin oxide ($SnO_2$), indium oxide containing tungsten oxide, indium zinc oxide containing tungsten oxide, indium oxide containing titanium oxide, indium tin oxide containing titanium oxide, or the like may be used.

In the case where etching processing is needed for forming the gate electrode layer, a mask may be formed and dry etching or wet etching may be performed. The gate electrode layer can be etched into a tapered shape by ICP (inductively coupled plasma) etching and by appropriate adjustment of etching conditions (e.g., the amount of electric power applied to a coiled electrode, the amount of electric power applied to an electrode on the substrate side, and the electrode temperature on the substrate side). Note that a chlorine-based gas typified by $Cl_2$, $BCl_3$, $SiCl_4$, $CCl_4$, or the like; a fluorine-based gas typified by $CF_4$, $SF_6$, $NF_3$, or the like; or $O_2$ can be used as appropriate as an etching gas.

Although a single gate structure is described in this embodiment, a multi-gate structure such as a double gate structure may also be employed for the transistor. In that case, gate electrode layers may be provided above and below the semiconductor layer or a plurality of gate electrode layers may be provided only on one side of (above or below) the semiconductor layer.

Further, a structure in which a silicide is provided for the source and drain regions of the transistor may also be employed. The silicide is formed in such a manner that a conductive film is formed over the source and drain regions of the semiconductor layer, and silicon of the exposed source and drain regions of the semiconductor layer is made to react with the conductive film by heat treatment, a GRTA method, an LRTA method, or the like. Alternatively, the silicide may be formed by light irradiation using a laser or lamp. As a material of the conductive film which forms the silicide, the following can be used: titanium (Ti), nickel (Ni), tungsten (W), molybdenum (Mo), cobalt (Co), zirconium (Zr), hafnium (Hf), tantalum (Ta), vanadium (V), neodymium (Nd), chromium (Cr), platinum (Pt), palladium (Pd), or the like.

The wiring layers that serve as source and drain electrode layers can be formed in such a manner that a conductive film is formed by a PVD method, a CVD method, an evaporation method, or the like and then the conductive film is etched into a desired shape. Alternatively, the wiring layers can be selectively formed at a predetermined place by a printing method, an electroplating method, or the like. Further, a reflow method and a damascene method may also be used. Materials of the wiring layers include a metal such as Ag, Au, Cu, Ni, Pt, Pd, Ir, Rh, W, Al, Ta, Mo, Cd, Zn, Fe, Ti, Zr, or Ba, a semiconductor such as Si or Ge, or an alloy or a nitride thereof. Alternatively, a light-transmitting material can be used.

Light-transmitting conductive materials include indium tin oxide (ITO), indium tin oxide containing silicon oxide (ITSO), indium zinc oxide (IZO) containing zinc oxide (ZnO), zinc oxide (ZnO), ZnO doped with gallium (Ga), tin oxide ($SnO_2$), indium oxide containing tungsten oxide, indium zinc oxide containing tungsten oxide, indium oxide containing titanium oxide, indium tin oxide containing titanium oxide, and the like.

As a semiconductor element, not to mention a field-effect transistor, a memory element using a semiconductor layer can be employed for the semiconductor device according to an embodiment of the present invention; accordingly, a semiconductor device which can meet functions required for various applications can be manufactured and provided.

Embodiment 7

A semiconductor device such as a wireless tag includes a semiconductor integrated circuit formed using a number of micro semiconductor elements; thus, malfunctions of the circuit or damages of the semiconductor element are easily caused by an external electrostatic discharge (ESD). In particular, as the wireless tag and the like, antennas and the like that includes a conductor having a large surface area, have a high possibility to generate the electrostatic discharge. In this embodiment, an example of a structure to protect the semiconductor integrated circuit from such an electrostatic discharge is described.

FIGS. 11A to 11D illustrate examples of the structures. In this embodiment, the semiconductor integrated circuit is protected by providing a shield including a conductive material in the vicinity of the semiconductor integrated circuit.

Figure 11A:
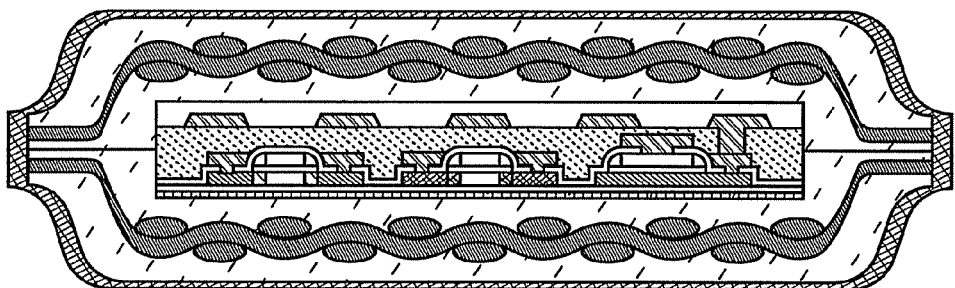
FIGS. 11A to 11D illustrate an example of manufacturing steps of a semiconductor device.

FIG. 11A illustrates an example in which a shield 1101 is formed to entirely cover the exterior of the semiconductor integrated circuit chip. The shield 1101 may be formed to a thickness that does not hinder the antenna from receiving of a carrier wave or an amplitude modulation wave from a reader/writer as much as possible.

Note that the shield 1101 is formed so as to cover an upper surface, a lower surface, and side surfaces of the semiconductor integrated circuit chip in FIG. 11A. For the formation, after the shield is formed on part of the upper surface and the side surfaces, the semiconductor integrated circuit is turned over and the shield is formed on part of the lower surface and the side surfaces so as to cover the entire exterior.

Figure 11B:
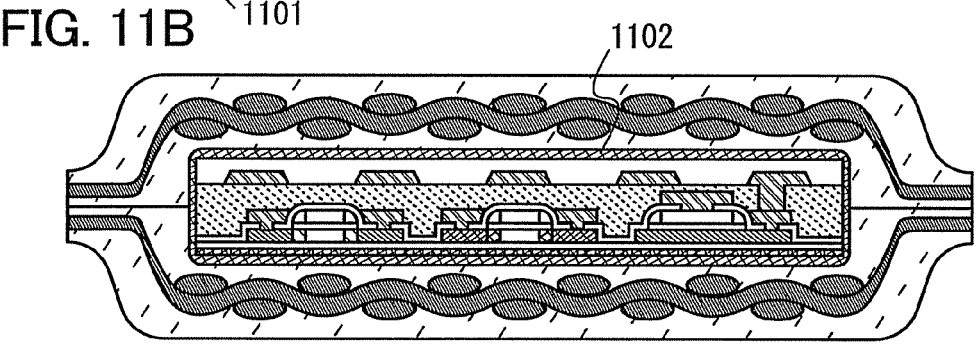

FIG. 11B illustrates an example in which a shield 1102 is formed inside the insulators to entirely cover the semiconductor integrated circuit. In order to form the shield 1102 so as to entirely cover the semiconductor integrated circuit as described above, each of the semiconductor integrated circuit chip needs to be, but is not limited to, separated and provided with the shield 1102 before the insulators are bonded to sandwich the semiconductor integrated circuit. For example, before the insulators are bonded to sandwich the semiconductor integrated circuit chip, a shield may be formed on an upper surface and a lower surface of the semiconductor integrated circuit. After the insulators are bonded to sandwich the semiconductor integrated circuit chip and laser light irradiation is performed to separate it, the shield is fused at the separation surface and side surfaces of the semiconductor integrated circuit may be covered with the welded shield from above and below.

Figure 11C:
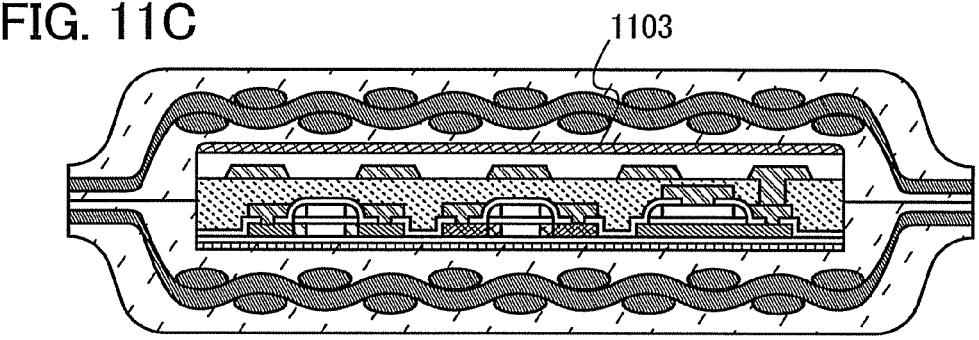

FIG. 11C illustrates an example in which a shield 1103 is formed inside the insulators and on one surface of the semiconductor integrated circuit. In this example, the shield 1103 is formed on the antenna side; however, it may be formed on the separation surface side.

By forming the shield only on one surface of the semiconductor integrated circuit, the antenna is not hindered by the shield from receiving of a carrier wave or an amplitude modulation wave from a reader/writer, and precise communication can be kept favorably.

Figure 11D:
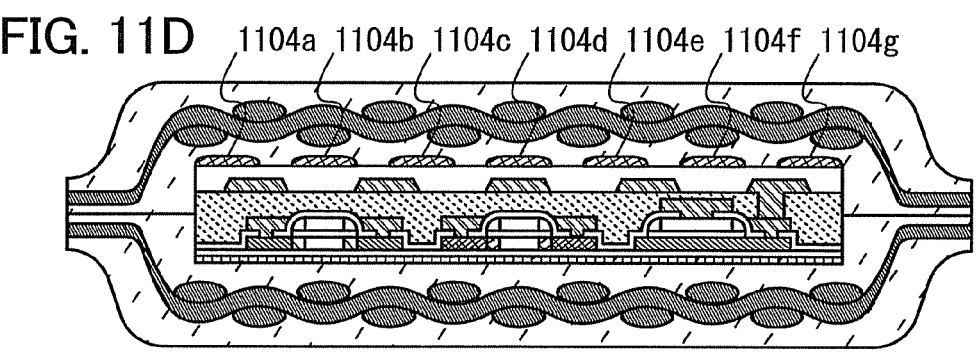

FIGS. 11A to 11C illustrate examples in which the shields are formed into a film form using a conductive material; however, the shield may be formed into an island form as shields 1104a to 1104g in FIG. 11D. Each of the shields 1104a to 1104g is formed of a conductive material and has conductivity; however, they are not electrically connected to each other because they are formed to be scattered over the semiconductor integrated circuit. As a result, the shields as a whole serve as an insulating film although they are formed using a conductive material. In a case where the shields are formed to have such a structure, each of the shields 1104a to 1104g formed using a conductive material protects the semiconductor integrated circuit favorably from an electrostatic discharge. In addition, the shield as a whole does not have a form as a conductive film, the antenna is not hindered by the shields from receiving of a carrier wave or an amplitude modulation wave from a reader/writer, and precise communication can be kept favorably.

The shield 1101 may preferably be formed using a conductor or a semiconductor, for example, a metal film, a metal oxide film, a semiconductor film, a metal nitride film, or the like. Specifically, the shield 1101 may be formed using an element selected from titanium, molybdenum, tungsten, aluminum, copper, silver, gold, nickel, platinum, palladium, iridium, rhodium, tantalum, cadmium, zinc, iron, silicon, germanium, zirconium, and barium; an alloy material, a compound material, a nitride material, or an oxide material containing the above element as a main component; or the like.

As the nitride material, tantalum nitride, titanium nitride, or the like can be used.

As the oxide material, indium tin oxide (ITO), indium tin oxide containing silicon oxide (ITSO), organic indium, organic tin, zinc oxide, or the like can be used. Alternatively, indium zinc oxide (IZO) containing zinc oxide (ZnO), zinc oxide (ZnO), zinc oxide containing gallium (Ga), tin oxide ($SnO_2$), indium oxide containing tungsten oxide, indium zinc oxide containing tungsten oxide, indium oxide containing titanium oxide, indium tin oxide (ITO) containing titanium oxide, or the like may be used.

Alternatively, a semiconductor film formed of a semiconductor added with an impurity element or the like to have conductivity, or the like can be used. For example, a polycrystalline silicon film doped with an impurity element such as phosphorus, or the like can be used.

Further alternatively, a conductive high molecule (also referred to as a conductive polymer) may be used as the shield. A so-called π-electron conjugated conductive polymer can be used as the conductive polymer. For example, polyaniline and/or a derivative thereof, polypyrrole and/or a derivative thereof, polythiophene and/or a derivative thereof, a copolymer of two or more kinds of those materials, or the like can be used.

Specific examples of a conjugated conductive polymer include polypyrrole, poly(3-methylpyrrole), poly(3-butylpyrrole), poly(3-octylpyrrole), poly(3-decylpyrrole), poly(3,4-dimethylpyrrole), poly(3,4-dibutylpyrrole), poly(3-hydroxypyrrole), poly(3-methyl-4-hydroxypyrrole), poly(3-methoxypyrrole), poly(3-ethoxypyrrole), poly(3-octoxypyrrole), poly(3-carboxylpyrrole), poly(3-methyl-4-carboxylpyrrole), polyN-methylpyrrole, polythiophene, poly(3-methylthiophene), poly(3-butylthiophene), poly(3-octylthiophene), poly(3-decylthiophene), poly(3-dodecylthiophene), poly(3-methoxythiophene), poly(3-ethoxythiophene), poly(3-octoxythiophene), poly(3-carboxylthiophene), poly(3-methyl-4-carboxylthiophene), poly(3,4-ethylenedioxythiophene), polyaniline, poly(2-methylaniline), poly(2-octylaniline), poly(2-isobutylaniline), poly(3-isobutylaniline), poly(2-anilinesulfonic acid), and poly(3-anilinesulfonic acid), and the like.

An organic resin or a dopant (a halogen, a Lewis acid, an inorganic acid, an organic acid, a halide of a transition metal, an organic cyano compound, a nonionic surfactant, or the like) may be contained in the shield containing a conductive polymer.

The shield can be formed by a variety of dry processes such as a sputtering method, a plasma CVD method, or an evaporation method; or a variety of wet processes such as a coating method, a printing method, or a droplet discharge method (an ink jet method).

Embodiment 8

An embodiment of the present invention can provide a semiconductor device serving as a wireless tag (hereinafter also referred to as a "wireless chip", a "wireless processor", and a "wireless memory"). An applicable range of the semiconductor device according to an embodiment of the present invention is wide, and the semiconductor device can be applied to any product as long as it clarifies information of an object, such as the history thereof, without contact and is useful for production, management, or the like. For example, the semiconductor device according to an embodiment of the present invention may be incorporated in bills, coins, securities, certificates, bearer bonds, packaging containers, documents, recording media, personal belongings, vehicles, groceries, garments, health products, daily commodities, medicines, and electronic devices. Examples of these products are described with reference to FIGS. 10A to 10G.

The bills and coins are money that circulates in the market, and includes one that can be used in the same way as money in a specific area (cash voucher), a commemorative coin, and the like. The securities refer to checks, certificates, promissory notes, and the like, which can be provided with a chip 1001 having a processor circuit (see FIG. 10A). The certificates refer to driver's licenses, certificates of residence, and the like, which can be provided with a chip 1002 having a processor circuit (see FIG. 10B). The personal belongings refer to bags, glasses, and the like, which can be provided with a chip 1003 having a processor circuit (see FIG. 10C). The bearer bonds refer to stamps, rice coupons, various merchandise coupons, and the like. The packing containers refer to wrapping paper for food containers and the like, plastic bottles, and the like, which can be provided with a chip 1004 having a processor circuit (see FIG. 10D). The documents refer to books and the like, which can be provided with a chip 1005 having a processor circuit (see FIG. 10E). The recording media refer to a DVD software, a video tape, and the like, which can be provided with a chip 1006 having a processor circuit (see FIG. 10F). The vehicles refer to wheeled vehicles such as bicycles, ships, and the like, which can be provided with a chip 1007 having a processor circuit (see FIG. 10G). The groceries refer to foods, beverages, and the like. The garments refer to clothes, shoes, and the like. The health products refer to a medical apparatus, a health appliance, and the like. The daily commodities refer to furniture, lighting apparatus, and the like. The medicines refer to a drug, an agricultural chemical, and the like. The electronic devices refer to a liquid crystal display device, an EL display device, television sets (a television receiver and a thin television receiver), a cellular phone, and the like.

The semiconductor device can be provided by being attached to the surface of an article or being embedded in an article. For example, in the case of a book, the semiconductor device may be embedded in the paper; and in the case of a package made of an organic resin, the semiconductor device may be embedded in the organic resin.

As described above, the efficiency of an inspection system, a system used in a rental shop, or the like can be improved by providing the packing containers, the recording media, the personal belonging, the groceries, the garments, the daily commodities, the electronic devices, or the like with the semiconductor device. In addition, by providing the vehicles with the semiconductor device, forgery or theft can be prevented. In addition, when the semiconductor device is implanted into creatures such as animals, each creature can be identified easily. For example, by implanting/attaching the semiconductor device with a sensor in/to a creature such as livestock, its health condition such as a current body temperature as well as its birth year, sex, breed, or the like can be easily managed.

This embodiment can be implemented in combination with any of the other embodiments and an example as appropriate.

Example 1

In this example, a result of measurement of input/output characteristics of a regulator circuit according to an embodiment of the present invention and a conventional regulator circuit are compared.

Figure 8:
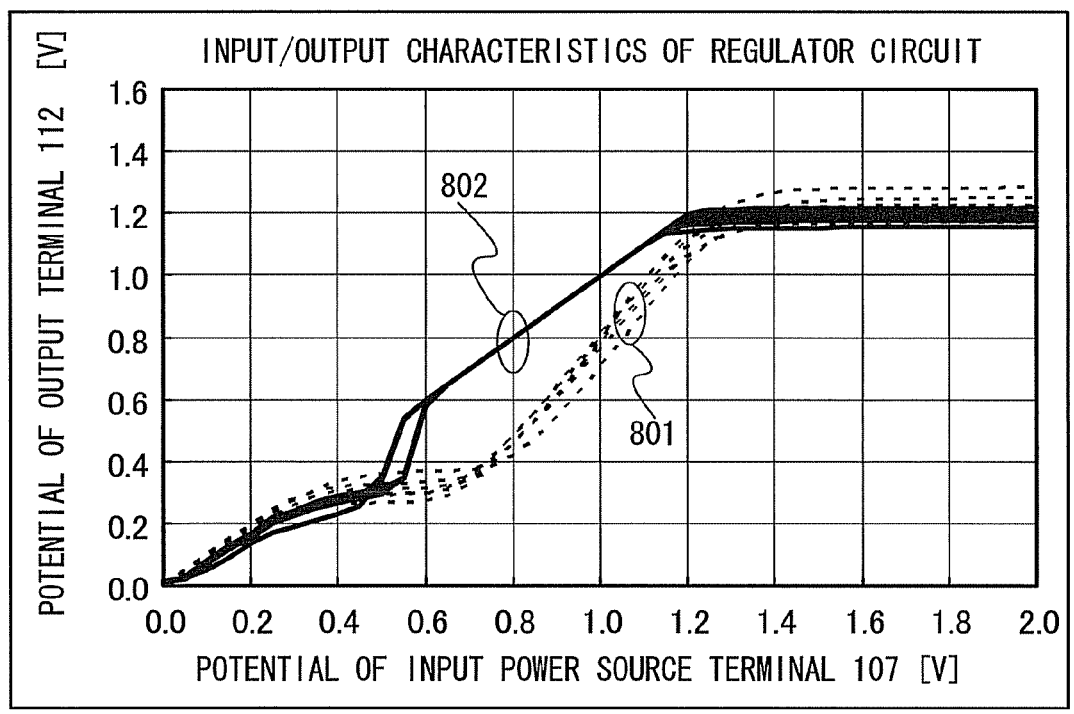
FIG. 8 shows input/output characteristics of a regulator circuit according to an embodiment of the present invention and of a conventional regulator circuit.

FIG. 8 shows the result of comparison of the input/output characteristics of the regulator circuit according to an embodiment of the present invention and of the conventional regulator circuit. A potential that appears in an output terminal when a potential of a terminal that corresponds to an input power source terminal is changed is measured, which corresponds to, in the regulator circuit according to an embodiment of the present invention, a potential of the output terminal 112 with respect to the input power source terminal 107. Curves denoted by reference numeral 801 indicate the input/output characteristics of the conventional regulator circuit. Curves denoted by reference numeral 802 indicate the input/output characteristics of the regulator circuit according to an embodiment of the present invention. A similar measurement is conducted on each of a plurality of samples, and the results are plotted in the graph.

In a region where a potential of the input power source terminal is between 0 V and about 0.4 V, no significant difference is seen in input/output characteristics of both the conventional regulator circuit and the regulator circuit according to an embodiment of the present invention. In a region where a potential of the input power source terminal is over 1.2 V, the graph shows that each of the regulator circuits is operated normally and outputs a constant potential of about 1.2 V regardless of a potential of the input power source terminal.

In the conventional regulator circuit, at the point where a potential of the input power source terminal is about 0.6 V, the potential of the output terminal is increased only to about 0.4 V. Although the potential of the output terminal is gently increased from the point where the potential of the input power source terminal is about 0.8 V, there is a loss of about 0.2 V with respect to the potential of the input power source terminal.

On the other hand, in the regulator circuit according to an embodiment of the present invention, the potential of the input power source terminal rises sharply at a point where the potential is 0.6 V. After that, as the potential of the input power source terminal is increased, the potential of the output terminal is also increased. In addition, almost the same potential as the potential of the input power source terminal can be output. Therefore, in a region where the potential of the input power source terminal is between 0.6 V and 1.2 V, that is, in a region where a received power is relatively low, it was confirmed that the regulator circuit according to an embodiment of the present invention is operated normally with a lower voltage than that of the conventional regulator circuit.

This application is based on Japanese Patent Application serial no. 2008-257008 filed with Japan Patent Office on Oct. 2, 2008, the entire contents of which are hereby incorporated by reference.

EXPLANATION OF REFERENCE

100: voltage regulator, 101: transistor, 102: transistor, 103: transistor, 104: transistor, 105: transistor, 106: transistor, 107: input power source terminal, 108: reference power source terminal, 109: bias circuit, 110: resistor, 112: output terminal, 200: RFID tag, 201: rectifier circuit, 202: regulator circuit, 203: arithmetic circuit, 210: antenna circuit, 211: antenna, 212: capacitor, 213: input power source terminal, 214: reference power source terminal, 215: output terminal, 220: reader/writer, 300: bias circuit, 301: voltage regulator, 302: voltage regulator, 311: input power source terminal, 313: output power source terminal, 321: differential amplifier circuit, 322: voltage divider, 331: differential amplifier circuit, 332: voltage divider, 900: substrate, 901: separation layer, 902: transistor, 903: transistor, 904: capacitor, 905: insulating layer, 910: semiconductor integrated circuit, 911: antenna, 912: protective film, 920: insulator, 921: fibrous body, 922: organic resin, 930: insulator, 931: fibrous body, 932: organic resin, 941: separation surface, 1001: chip, 1002: chip, 1003: chip, 1004: chip, 1005: chip, 1006: chip, 1007: chip, 1101: shield, 1102: shield, 1103: shield, 1201: substrate, 1202: separation layer, 1203: insulating film, 1204: semiconductor film, 1205: gate insulating film, 1207: gate electrode, 1208: insulating film, 1209: insulating film, 1210: insulating film, 1211: insulating film, 1212: insulating film, 1213: insulating film, 1214: opening, 1215: region, 1217: conductive film, 1218: insulating film, 1220: antenna, 1221: conductive film, 1222: conductive film, 1223: insulating film, 1242: region, 1249: element layer, 1104a: shield, 1204a: semiconductor film, 1204b: semiconductor film, 1206a: channel formation region, 1206b: impurity region, 1206b: impurity region, 1230a: thin film transistor, 1230b: thin film transistor, 1231a: conductive film, 1231b: conductive film.

The invention claimed is:

1. A semiconductor device that monitors a voltage between a reference potential and an input potential and obtains a constant output potential regardless of a value of the voltage after the voltage exceeds a predetermined threshold voltage, comprising:
   a first to sixth transistors and a resistor, in which:
   a gate of the first transistor is electrically connected to a gate of the second transistor,
   either a source or a drain of the first transistor is electrically connected to a first wiring and the other of the source and the drain of the first transistor is electrically connected to either a source or a drain of the third transistor,
   either a source or a drain of the second transistor is electrically connected to the first wiring and the other of the source and the drain of the second transistor is electrically connected to either a source or a drain of the fourth transistor,
   a gate of the second transistor is electrically connected to the other of the source and the drain of the second transistor,
   a gate of the third transistor is electrically connected to the other of the source and the drain of the fourth transistor,
   the other of the source and the drain of the third transistor is electrically connected to a second wiring,
   a gate of the fourth transistor is electrically connected to either the source or the drain of the third transistor,
   one terminal of the resistor is electrically connected to the other of the source and the drain of the fourth transistor and the other terminal of the resistor is electrically connected to the second wiring,
   a gate of the fifth transistor is electrically connected to the other of the source and the drain of the second transistor,
   either a source or a drain of the fifth transistor is electrically connected to the first wiring and the other of the source and the drain of the fifth transistor is electrically connected to either a source or a drain of the sixth transistor,
   a gate of the sixth transistor is electrically connected to either the source or the drain of the sixth transistor and the other of the source and the drain of the sixth transistor is electrically connected to the second wiring.

2. A semiconductor device according to claim 1, wherein:
   the input potential is applied to the first wiring,
   the reference potential is applied to the second wiring,
   the other of the source and the drain of the second transistor generates a first bias voltage, and
   the other of the source and the drain of the fifth transistor extracts the output potential.

3. A regulator circuit comprising:
   the semiconductor device according to claim 1; and
   a voltage regulator that outputs a potential in accordance with the output potential.

4. An RFID tag comprising the semiconductor device according to claim 3.

5. A semiconductor device according to claim 1, wherein the first transistor is a p-channel transistor.

6. A semiconductor device according to claim 1, wherein the second transistor is a p-channel transistor.

7. A semiconductor device according to claim 1, wherein the third transistor is an n-channel transistor.

8. A semiconductor device according to claim 1, wherein the fourth transistor is an n-channel transistor.

9. A semiconductor device according to claim 1, wherein the fifth transistor is a p-channel transistor.

10. A semiconductor device according to claim 1, wherein the sixth transistor is an n-channel transistor.

11. A regulator circuit comprising:
    a reference power supply terminal;
    an input power supply terminal;
    a bias circuit;
    a first transistor provided in the bias circuit, wherein one of a source and a drain of the first transistor is connected to the input power supply terminal;
    a second transistor provided in the bias circuit, wherein one of a source and a drain of the second transistor is connected to the input power supply terminal, and a gate of the first transistor is connected to a gate of the second transistor;
    a third transistor provided in the bias circuit, wherein one of a source and a drain of the third transistor is connected to the reference power supply terminal, and the other of the source and the drain of the third transistor is connected to the other one of the source and the drain of the first transistor;
    a fourth transistor provided in the bias circuit, wherein one of a source and a drain of the fourth transistor is connected to the other of the source and the drain of the second transistor, and a gate of the fourth transistor is connected to the other of the source and the drain of the third transistor;
    a resistor provided in the bias circuit, wherein one terminal of the resistor is connected to the reference power supply terminal, and the other terminal of the resistor is connected to the other of the source and the drain of the second transistor;
    a fifth transistor provided in the bias circuit, wherein a gate of the fifth transistor is connected to the other of the source and the drain of the second transistor, and one of a source and a drain of the fifth transistor is connected to the one of the source and the drain of the second transistor;
    a sixth transistor provided in the bias circuit, wherein one of a source and a drain of the sixth transistor is connected to the reference power supply terminal, and the other of the source and the drain of the sixth transistor is connected to the other of the source and the drain of the fifth transistor, and a gate of the sixth transistor is connected to the other of the source and the drain of the sixth transistor, and a constant potential is outputted with respect to the reference power supply terminal by the bias circuit:

an output terminal; and a voltage regulator for outputting a potential to the output terminal in accordance with the constant potential.

12. A regulator circuit according to claim 11, wherein a same current flows through the first transistor and the second transistor.

13. A regulator circuit according to claim 11, wherein the first transistor is a p-channel transistor.

14. A regulator circuit according to claim 11, wherein the second transistor is a p-channel transistor.

15. A regulator circuit according to claim 11, wherein the third transistor is an n-channel transistor.

16. A regulator circuit according to claim 11, wherein the fourth transistor is an n-channel transistor.

17. A regulator circuit according to claim 11, wherein the fifth transistor is a p-channel transistor.

18. A regulator circuit according to claim 11, wherein the sixth transistor is an n-channel transistor.

* * * * *